(12) United States Patent
Yang et al.

(10) Patent No.: US 12,463,854 B2
(45) Date of Patent: Nov. 4, 2025

(54) SINGLE-CARRIER FREQUENCY-DIVISION MULTIPLEXING (SC-FDM) FOR WIRELESS LOCAL AREA NETWORKS (WLANS)

(71) Applicant: QUALCOMM Incorporated, San Diego, CA (US)

(72) Inventors: Lin Yang, San Diego, CA (US); Bin Tian, San Diego, CA (US); Youhan Kim, Saratoga, CA (US); Jialing Li Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 586 days.

(21) Appl. No.: 17/843,747

(22) Filed: Jun. 17, 2022

(65) Prior Publication Data

US 2023/0412325 A1  Dec. 21, 2023

(51) Int. Cl.
*H04L 27/26* (2006.01)
*H04L 5/00* (2006.01)

(52) U.S. Cl.
CPC ........ *H04L 27/2602* (2013.01); *H04L 5/0007* (2013.01); *H04L 5/0098* (2013.01)

(58) Field of Classification Search
CPC .......................... H04L 27/2602; H04L 5/0007
See application file for complete search history.

(56) References Cited

U.S. PATENT DOCUMENTS

2005/0249181 A1* 11/2005 Vijayan ................. H04L 25/022
  370/338

2007/0263738 A1* 11/2007 Jitsukawa ........... H04L 27/2636
  375/260

(Continued)

FOREIGN PATENT DOCUMENTS

WO  WO-2005122447 A1 * 12/2005 ........... H04L 25/022
WO  WO-2008138807 A1 * 11/2008 ......... H04L 27/2614

(Continued)

OTHER PUBLICATIONS

International Search Report and Written Opinion—PCT/US2023/067855—ISA/EPO—Nov. 2, 2023.

(Continued)

*Primary Examiner* — Kevin C. Harper
(74) *Attorney, Agent, or Firm* — Kevin M. Donnelly; Holland & Hart LLP

(57) ABSTRACT

This disclosure provides methods, devices and systems for reducing PAPR in wireless communications. Some implementations more specifically relate to single-carrier frequency-division multiplexing (SC-FDM) techniques that can be used for wireless communications in wireless local area networks (WLANs). In some aspects, a wireless communication device may modulate a physical layer convergence protocol (PLCP) protocol data unit (PPDU) as a series of symbols in the time domain and may transform a subset of the time-domain symbols into a number (Q) of frequency-domain samples based on a Q-point discrete Fourier transform (DFT). The wireless communication device maps the Q frequency-domain samples to a number (N) of orthogonal subcarriers (representing an orthogonal frequency-division multiplexing (OFDM) symbol), where N>Q, and transforms the N subcarriers into N time-domain samples, based on an inverse fast Fourier transform (IFFT), for transmission over a wireless channel.

24 Claims, 20 Drawing Sheets

(56) References Cited

U.S. PATENT DOCUMENTS

| | | | |
|---|---|---|---|
| 2008/0176523 A1* | 7/2008 | Sutton | H04L 5/0007 |
| | | | 455/76 |
| 2008/0298502 A1* | 12/2008 | Xu | H04L 5/0055 |
| | | | 375/299 |
| 2009/0231990 A1* | 9/2009 | Lee | H04L 1/0041 |
| | | | 370/207 |
| 2011/0194544 A1 | 8/2011 | Yang et al. | |
| 2015/0124750 A1 | 5/2015 | Vermani et al. | |
| 2017/0126456 A1* | 5/2017 | Lee | H04L 27/2602 |
| 2017/0331734 A1* | 11/2017 | Cariou | H04L 45/74 |
| 2018/0097671 A1* | 4/2018 | Huang | H04L 27/261 |
| 2018/0375707 A1* | 12/2018 | Bala | H04L 27/2605 |
| 2023/0164011 A1 | 5/2023 | Park et al. | |
| 2024/0056342 A1* | 2/2024 | Liu | H04L 27/2621 |

FOREIGN PATENT DOCUMENTS

| | | | |
|---|---|---|---|
| WO | WO-2009149561 A1 * | 12/2009 | H04B 1/7115 |
| WO | WO-2021241908 A1 | 12/2021 | |

OTHER PUBLICATIONS

Partial International Search Report—PCT/US2023/067855—ISA/EPO—Sep. 11, 2023.

* cited by examiner

SINGLE-CARRIER FREQUENCY-DIVISION MULTIPLEXING (SC-FDM) FOR WIRELESS LOCAL AREA NETWORKS (WLANS)

TECHNICAL FIELD

This disclosure relates generally to wireless communication, and more specifically, to single-carrier frequency-division multiplexing (SC-FDM) for wireless local area networks (WLANs).

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

Many existing WLAN communication protocols utilize orthogonal frequency-division multiplexing (OFDM) techniques, which tend to produce signals with relatively high peak-to-average power ratio (PAPR). Wireless signals having high PAPR require large power backoffs for transmission. As such, high PAPR may impact the effective range or efficiency of OFDM transmissions. Wireless communications on higher carrier frequencies suffer from even greater path loss compared to wireless communications on lower carrier frequencies. Thus, new communication protocols and modes of operation may be needed to reduce the PAPR associated with wireless communications, for example, to communicate over extended ranges or overcome path loss associated with higher carrier frequencies.

SUMMARY

The systems, methods and devices of this disclosure each have several innovative aspects, no single one of which is solely responsible for the desirable attributes disclosed herein.

One innovative aspect of the subject matter described in this disclosure can be implemented as a method of wireless communication. The method may be performed by a wireless communication device, and may include modulating a physical layer (PHY) convergence protocol (PLCP) protocol data unit (PPDU), including a PHY preamble followed by a data portion, as a plurality of symbols, where the PHY preamble includes a short training field (STF), a long training field (LTF), and one or more signal (SIG) fields carrying information for interpreting the PPDU; transforming a number (Q) of symbols, including one or more first symbols of the plurality of symbols representing the PPDU, into Q frequency-domain samples based on a discrete Fourier transform (DFT); mapping the Q frequency-domain samples to a number (N) of subcarriers, where N>Q; transforming the N subcarriers into N time-domain samples based on an inverse fast Fourier transform (IFFT); and transmitting the N time-domain samples over a wireless channel. In some aspects, Q may only be divisible by 2, 3, or 5.

In some aspects, the method may further include mapping one or more null values to one or more subcarriers, respectively, of the N subcarriers, where each of the one or more subcarriers represents a direct current (DC) subcarrier associated with a bandwidth of the wireless channel. In some aspects, the N subcarriers may be subdivided into a number (n) of sections each associated with a respective index (i), where $1 \leq i \leq n$. In such aspects, the method may further include applying a series of first phase rotations to the subcarriers in each section, of the n sections, associated with an even index i; and applying a series of second phase rotations to the subcarriers in each section, of the n sections, associated with an odd index i, where the series of second phase rotations is different than the series of first phase rotations.

In some aspects, the Q symbols may further include one or more pilot symbols associated with a phase tracking operation. In some implementations, the one or more pilot symbols may be interspersed between the one or more first symbols. In some other implementations, the one or more pilot symbols may be positioned contiguously, in the time domain, following the one or more first symbols. In some implementations, the method may further include prepending, to the N time-domain samples, a cyclic prefix that includes the one or more pilot symbols.

In some other aspects, the Q symbols may further include one or more null symbols positioned contiguously, in the time domain, following the one or more first symbols, where each of the one or more null symbols has a value equal to zero that maps to a respective null sample of the N time-domain samples. In such aspects, the method may further include transmitting a sequence of guard interval (GI) values immediately preceding the N time-domain samples; and modulating the sequence of GI values on the one or more null samples of the N time-domain samples.

In some aspects, the method may further include mapping one or more second symbols of the plurality of symbols directly to the N subcarriers, where the one or more second symbols represent at least a portion of the PHY preamble. In some implementations, the portion of the PHY preamble may include the LTF. In some implementations, the LTF may be modulated according to a modulation scheme having a higher modulation order than binary phase-shift keying (BPSK). In some other implementations, the LTF may include a sequence of values (x) associated with a Zadoff-Chu sequence having a sequence index (m), a root index (u), and a sequence length (N), where:

$$x(m) = e^{-j\frac{\pi u m(m+1)}{N}}$$

In some implementations, N may be a prime number associated with a resource unit (RU) or multiple-RU (M-RU) to which the Q frequency-domain samples are mapped. In some other implementations, N may be a prime number associated with a bandwidth of the wireless channel.

Another innovative aspect of the subject matter described in this disclosure can be implemented in a wireless communication device. In some implementations, the wireless communication device may include at least one memory and at least one processor communicatively coupled with the at least one memory and configured to cause the wireless communication device to perform operations including modulating a PPDU, including a PHY preamble followed by a data portion, as a plurality of symbols, where the PHY preamble includes an STF, an LTF, and one or more SIG fields carrying information for interpreting the PPDU; transforming a number (Q) of symbols, including one or more first symbols of the plurality of symbols representing the PPDU, into Q frequency-domain samples based on a DFT; mapping the Q frequency-domain samples to a number (N) of subcarriers, where N>Q; transforming the N subcarriers into N time-domain samples based on an IFFT; and transmitting the N time-domain samples over a wireless channel.

Another innovative aspect of the subject matter described in this disclosure can be implemented as a method of wireless communication. The method may be performed by a wireless communication device and may include receiving, over a wireless channel, a time-varying signal carrying a PPDU that includes a PHY preamble followed by a data portion, where the PHY preamble includes an STF, an LTF, and one or more SIG fields carrying information for interpreting the PPDU; transforming a number (N) of first time-domain samples of the time-varying signal into N first modulated subcarriers based on an FFT; de-mapping the N first modulated subcarriers to a number (Q) of frequency-domain samples, where N>Q; transforming the Q frequency-domain samples into Q symbols based on an IDFT; demodulating the Q symbols; and recovering at least a portion of the PPDU from the Q demodulated symbols. In some aspects, Q may only be divisible by 2, 3, or 5.

In some aspects, the Q symbols may include one or more pilot symbols associated with a phase tracking operation. In some implementations, the one or more pilot symbols may be interspersed between one or more data symbols of the Q symbols representing the portion of the PPDU. In some other implementations, the one or more pilot symbols may be positioned contiguously, in the time domain, following one or more data symbols of the Q symbols representing the portion of the PPDU. In some implementations, the received time-varying signal may include a cyclic prefix preceding the N time-domain samples, where the cyclic prefix includes the one or more pilot symbols.

In some other aspects, the received time-varying signal includes a sequence of GI values immediately preceding the N time-domain samples. In such aspects, the method may further include recovering the sequence of GI values from one or more first symbols of the Q symbols positioned contiguously, in the time domain, following one or more data symbols of the Q symbols representing the portion of the PPDU.

In some aspects, the method may further include transforming N second time-domain samples of the received time-varying signal into N second modulated subcarriers based on the FFT; demodulating the N second modulated subcarriers; and recovering at least a portion of the PHY preamble from the N demodulated subcarriers. In some aspects, the portion of the PHY preamble recovered from the N demodulated subcarriers may include the LTF. In some implementations, the N second modulated subcarriers may be demodulated according to a modulation scheme having a higher modulation order than BPSK. In some other implementations, the LTF may include a sequence of values (x) associated with a Zadoff-Chu sequence having a sequence index (m), a root index (u), and a sequence length (N), where:

$$x(m) = e^{-j\frac{\pi u m(m+1)}{N}}$$

In some implementations, N may be a prime number associated with an RU or M-RU to which the Q frequency-domain samples are mapped. In some other implementations, N may be a prime number associated with a bandwidth of the wireless channel.

Another innovative aspect of the subject matter described in this disclosure can be implemented in a wireless communication device. In some implementations, the wireless communication device may include at least one memory and at least one processor communicatively coupled with the at least one memory and configured to cause the wireless communication device to perform operations including receiving, over a wireless channel, a time-varying signal carrying a PPDU that includes a PHY preamble followed by a data portion, where the PHY preamble includes an STF, an LTF, and one or more SIG fields carrying information for interpreting the PPDU; transforming a number (N) of first time-domain samples of the time-varying signal into N first modulated subcarriers based on an FFT; de-mapping the N first modulated subcarriers to a number (Q) of frequency-domain samples, where N>Q; transforming the Q frequency-domain samples into Q symbols based on an IDFT; demodulating the Q symbols; and recovering at least a portion of the PPDU from the Q demodulated symbols.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

Like reference numbers and designations in the various drawings indicate like elements.

DETAILED DESCRIPTION

Figure 1:
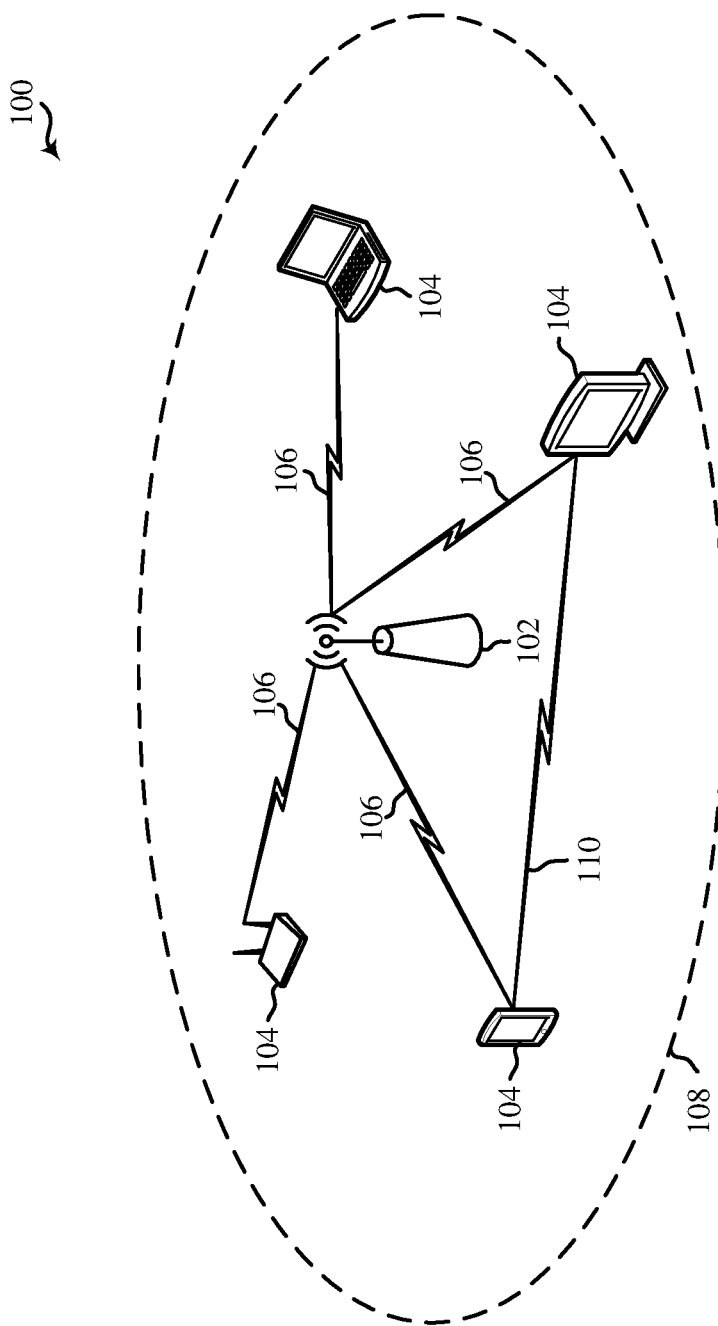
FIG. 1 shows a pictorial diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

As described above, many existing WLAN communication protocols utilize orthogonal frequency-division multiplexing (OFDM) techniques, which tend to produce signals with relatively high peak-to-average power ratio (PAPR). Wireless signals having high PAPR require large power backoffs for transmission. As such, high PAPR may impact the effective range or efficiency of OFDM transmissions. By contrast, single-carrier transmission techniques tend to produce wireless signals with significantly lower PAPR (compared to OFDM). Aspects of the present disclosure recognize that single-carrier transmission techniques can be used to boost the power of wireless signals without significantly increasing power consumption or reducing the efficiency of the power amplifier (compared to OFDM transmissions).

Various aspects relate generally to reducing PAPR in wireless communications, and more particularly, to single-carrier frequency-division multiplexing (SC-FDM) techniques that can be used for wireless communications in WLANs. In some aspects, a wireless communication device may modulate a physical layer (PHY) convergence protocol (PLCP) protocol data unit (PPDU) as a series of symbols in the time domain and may transform a subset of the time-domain symbols into a number (Q) of frequency-domain samples based on a Q-point discrete Fourier transform (DFT). In some implementations, Q may be an integer value that is only divisible by 2, 3, or 5. In some implementations, the wireless communication device may add one or more pilot symbols to the subset of time-domain symbols provided as inputs to the Q-point DFT. The wireless communication device maps the Q frequency-domain samples to a number (N) of orthogonal subcarriers (representing an OFDM symbol), where N>Q, and transforms the N subcarriers into N time-domain samples, based on an inverse fast Fourier transform (IFFT), for transmission over a wireless channel. In some aspects, the wireless communication device may further map one or more null values to one or more of the N subcarriers, respectively, where each of the one or more null subcarriers represents a direct current (DC) subcarrier associated with a bandwidth of the wireless channel. In some aspects, the wireless communication device may map at least a portion of a PHY preamble (including a long training field (LTF)) of the PPDU directly to the N subcarriers.

Particular implementations of the subject matter described in this disclosure can be implemented to realize one or more of the following potential advantages. By modulating a PPDU as a series of symbols in the time domain, aspects of the present disclosure can leverage the low PAPR properties of single-carrier waveforms to overcome path loss or extend the range of wireless communications in WLANs. Because the time-domain symbols are converted to the frequency domain and further mapped to OFDM symbols, such SC-FDM techniques can be implemented using existing WLAN (or OFDM) hardware. Aspects of the present disclosure recognize that many WLAN-capable devices also include hardware to support various 3GPP standards (such as LTE, 3G, 4G or 5G NR). Such hardware includes one or more Q-point DFTs, where Q is only divisible by 2, 3, or 5. Thus, by limiting the number (Q) of frequency-domain samples per OFDM symbol to numbers that are only divisible by 2, 3, or 5, the SC-FDM techniques of the present disclosure can further be implemented using existing 3GPP hardware. The tone plans associated with OFDM processing include pilot subcarriers that can be used for phase tracking in the frequency domain. However, mapping pilot values to particular subcarriers may increase the PAPR of the resulting signal. By contrast, inserting pilot symbols in the time domain allows phase tracking to be performed on the received signal without sacrificing the gains in PAPR associated with single-carrier transmissions. On the other, mapping null values directly to DC subcarriers allows frequency-domain processing for phase and DC offset correction (such as in accordance with existing WLAN protocols).

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2020 specification or amendments thereof including, but not limited to, 802.11ah, 802.11ad, 802.11ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 106 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 106, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 700 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, 802.11ax and 802.11be standard amendments may be transmitted over the 2.4, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2A:
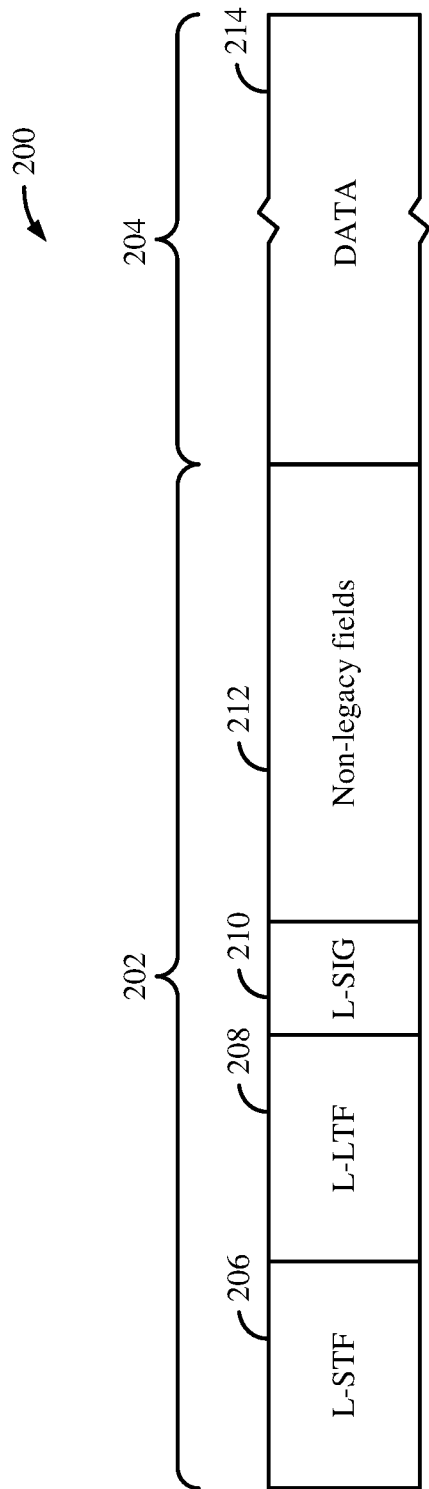
FIG. 2A shows an example protocol data unit (PDU) usable for communications between an access point (AP) and one or more wireless stations (STAs).

FIG. 2A shows an example protocol data unit (PDU) 200 usable for wireless communication between an AP 102 and one or more STAs 104. For example, the PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two BPSK symbols, a legacy long training field (L-LTF) 208, which may consist of two BPSK symbols, and a legacy signal field (L-SIG) 210, which may consist of two BPSK symbols. The legacy portion of the preamble 202 may be configured according to the IEEE 802.11a wireless communication protocol standard. The preamble 202 may also include a non-legacy portion including one or more non-legacy fields 212, for example, conforming to an IEEE wireless communication protocol such as the IEEE 802.11ac, 802.11ax, 802.11be or later wireless communication protocol protocols.

The L-STF 206 generally enables a receiving device to perform automatic gain control (AGC) and coarse timing and frequency estimation. The L-LTF 208 generally enables a receiving device to perform fine timing and frequency estimation and also to perform an initial estimate of the wireless channel. The L-SIG 210 generally enables a receiving device to determine a duration of the PDU and to use the determined duration to avoid transmitting on top of the PDU. For example, the L-STF 206, the L-LTF 208 and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MPDUs) or an aggregated MPDU (A-MPDU).

Figure 2B:
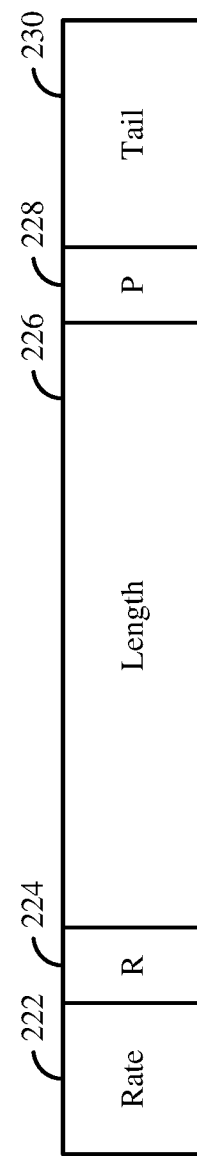
FIG. 2B shows an example field in the PDU of FIG. 2A.

FIG. 2B shows an example L-SIG 210 in the PDU 200 of FIG. 2A. The L-SIG 210 includes a data rate field 222, a reserved bit 224, a length field 226, a parity bit 228, and a tail field 230. The data rate field 222 indicates a data rate (note that the data rate indicated in the data rate field 212 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (vs) or other time units.

Figure 3:
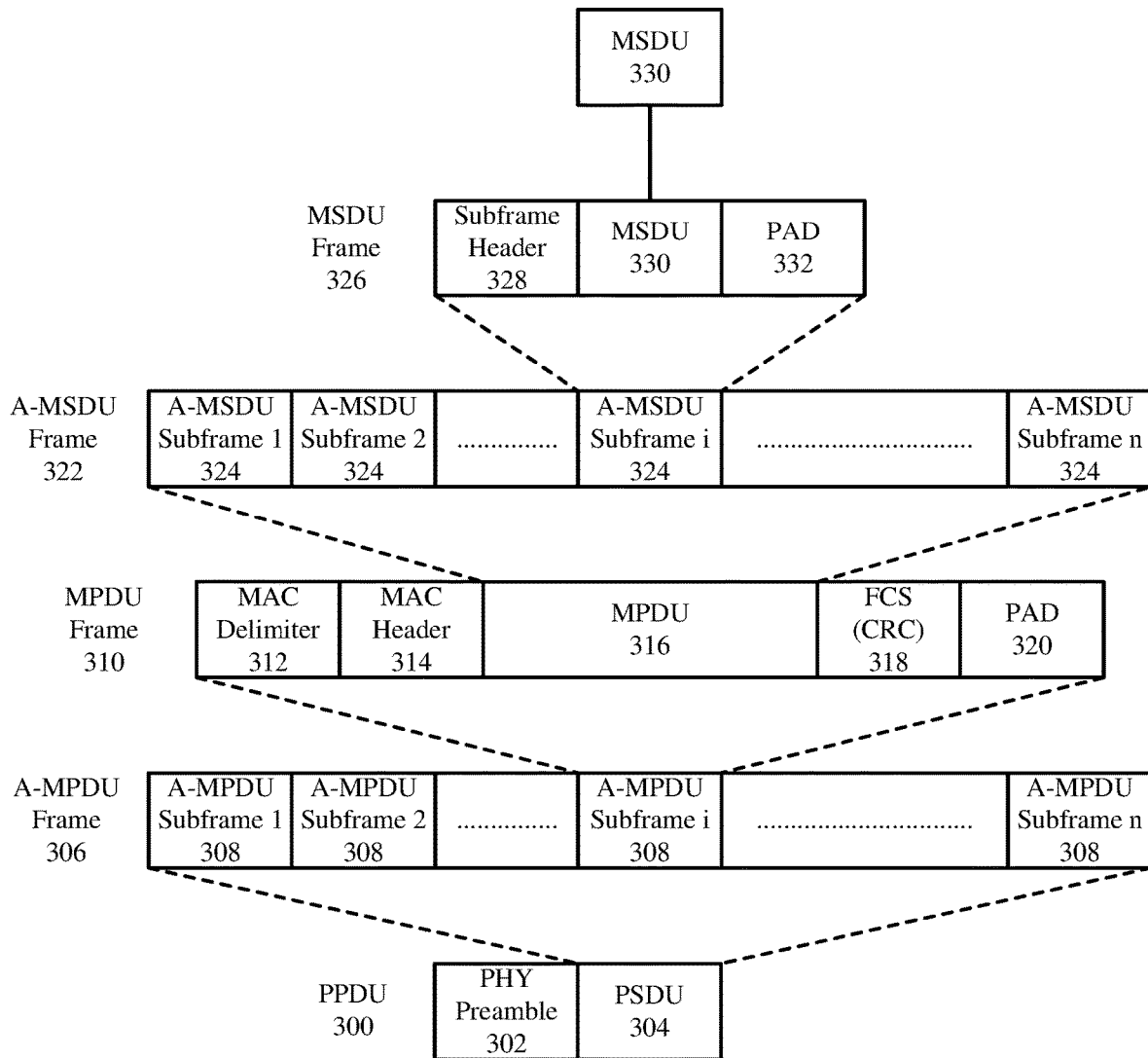
FIG. 3 shows an example physical layer convergence protocol (PLCP) protocol data unit (PPDU) usable for communications between an AP and one or more STAs.

FIG. 3 shows an example PPDU 300 usable for communications between an AP 102 and one or more STAs 104. As described above, each PPDU 300 includes a PHY preamble 302 and a PSDU 304. Each PSDU 304 may represent (or "carry") one or more MAC protocol data units (MPDUs) 316. For example, each PSDU 304 may carry an aggregated MPDU (A-MPDU) 306 that includes an aggregation of multiple A-MPDU subframes 308. Each A-MPDU subframe 306 may include an MPDU frame 310 that includes a MAC delimiter 312 and a MAC header 314 prior to the accompanying MPDU 316, which comprises the data portion ("payload" or "frame body") of the MPDU frame 310. Each MPDU frame 310 may also include a frame check sequence (FCS) field 318 for error detection (for example, the FCS field may include a cyclic redundancy check (CRC)) and padding bits 320. The MPDU 316 may carry one or more MAC service data units (MSDUs) 326. For example, the MPDU 316 may carry an aggregated MSDU (A-MSDU) 322 including multiple A-MSDU subframes 324. Each A-MSDU subframe 324 contains a corresponding MSDU 330 preceded by a subframe header 328 and in some cases followed by padding bits 332.

Referring back to the MPDU frame 310, the MAC delimiter 312 may serve as a marker of the start of the associated MPDU 316 and indicate the length of the associated MPDU 316. The MAC header 314 may include multiple fields containing information that defines or indicates characteristics or attributes of data encapsulated within the frame body 316. The MAC header 314 includes a duration field indicating a duration extending from the end of the PPDU until at least the end of an acknowledgment (ACK) or Block ACK (BA) of the PPDU that is to be transmitted by the receiving wireless communication device. The use of the duration field serves to reserve the wireless medium for the indicated duration, and enables the receiving device to establish its network allocation vector (NAV). The MAC header 314 also includes one or more fields indicating addresses for the data encapsulated within the frame body 316. For example, the MAC header 314 may include a combination of a source address, a transmitter address, a receiver address or a destination address. The MAC header 314 may further include a frame control field containing control information. The frame control field may specify a frame type, for example, a data frame, a control frame, or a management frame.

Figure 4:
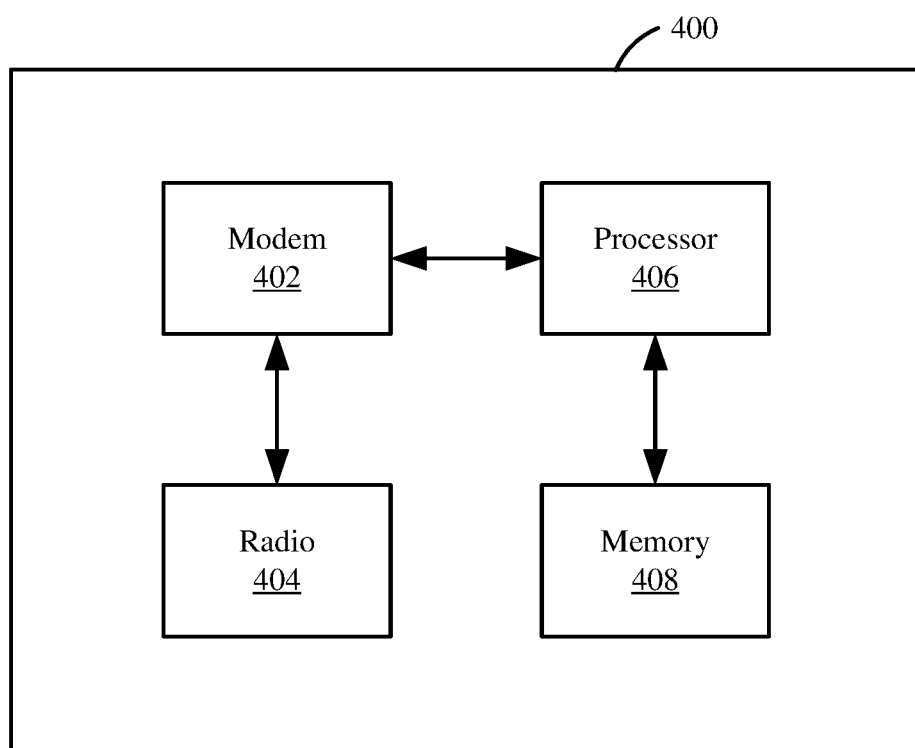
FIG. 4 shows a block diagram of an example wireless communication device.

FIG. 4 shows a block diagram of an example wireless communication device 400. In some implementations, the wireless communication device 400 can be an example of a device for use in a STA such as one of the STAs 104 described with reference to FIG. 1. In some implementations, the wireless communication device 400 can be an example of a device for use in an AP such as the AP 102 described with reference to FIG. 1. The wireless communication device 400 is capable of transmitting (or outputting for transmission) and receiving wireless communications (for example, in the form of wireless packets). For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ah, 802.11ad, 802.11ay, 802.11ax, 802.11az, 802.11ba and 802.11be.

The wireless communication device 400 can be, or can include, a chip, system on chip (SoC), chipset, package or device that includes one or more modems 402, for example, a Wi-Fi (IEEE 802.11 compliant) modem. In some implementations, the one or more modems 402 (collectively "the modem 402") additionally include a WWAN modem (for example, a 3GPP 4G LTE or 5G compliant modem). In some implementations, the wireless communication device 400 also includes one or more radios 404 (collectively "the radio 404"). In some implementations, the wireless communication device 406 further includes one or more processors, processing blocks or processing elements 406 (collectively "the processor 406") and one or more memory blocks or elements 408 (collectively "the memory 408").

The modem 402 can include an intelligent hardware block or device such as, for example, an application-specific integrated circuit (ASIC) among other possibilities. The modem 402 is generally configured to implement a PHY layer. For example, the modem 402 is configured to modulate packets and to output the modulated packets to the radio 404 for transmission over the wireless medium. The modem 402 is similarly configured to obtain modulated packets received by the radio 404 and to demodulate the packets to provide demodulated packets. In addition to a modulator and a demodulator, the modem 402 may further include digital signal processing (DSP) circuitry, automatic gain control (AGC), a coder, a decoder, a multiplexer and a demultiplexer. For example, while in a transmission mode, data obtained from the processor 406 is provided to a coder, which encodes the data to provide encoded bits. The encoded bits are then mapped to points in a modulation constellation (using a selected MCS) to provide modulated symbols. The modulated symbols may then be mapped to a number $N_{SS}$ of spatial streams or a number $N_{STS}$ of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 404. In implementations involving beamforming, the modulated symbols in the respective spatial streams are precoded via a steering matrix prior to their provision to the IFFT block.

While in a reception mode, digital signals received from the radio 404 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 406) for processing, evaluation or interpretation.

The radio 404 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication device 400 can include, or be coupled with, multiple transmit antennas (each with a corresponding transmit chain) and multiple receive antennas (each with a corresponding receive chain). The symbols output from the modem 402 are provided to the radio 404, which then transmits the symbols via the coupled antennas. Similarly, symbols received via the antennas are obtained by the radio 404, which then provides the symbols to the modem 402.

The processor 406 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 406 processes information received through the radio 404 and the modem 402, and processes information to be output through the modem 402 and the radio 404 for transmission through the wireless medium. For example, the processor 406 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 406 may generally control the modem 402 to cause the modem to perform various operations described above.

The memory 408 can include tangible storage media such as random-access memory (RAM) or read-only memory (ROM), or combinations thereof. The memory 408 also can store non-transitory processor- or computer-executable software (SW) code containing instructions that, when executed by the processor 406, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 5B:
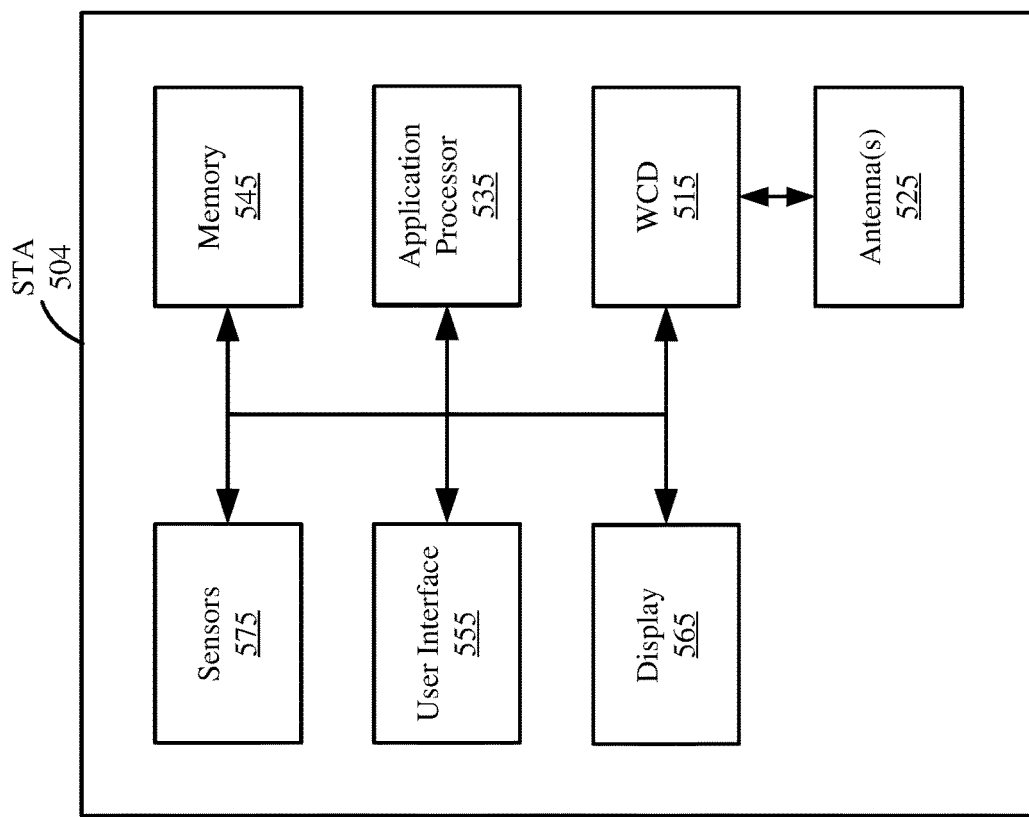
FIG. 5B shows a block diagram of an example STA.
Figure 5A:
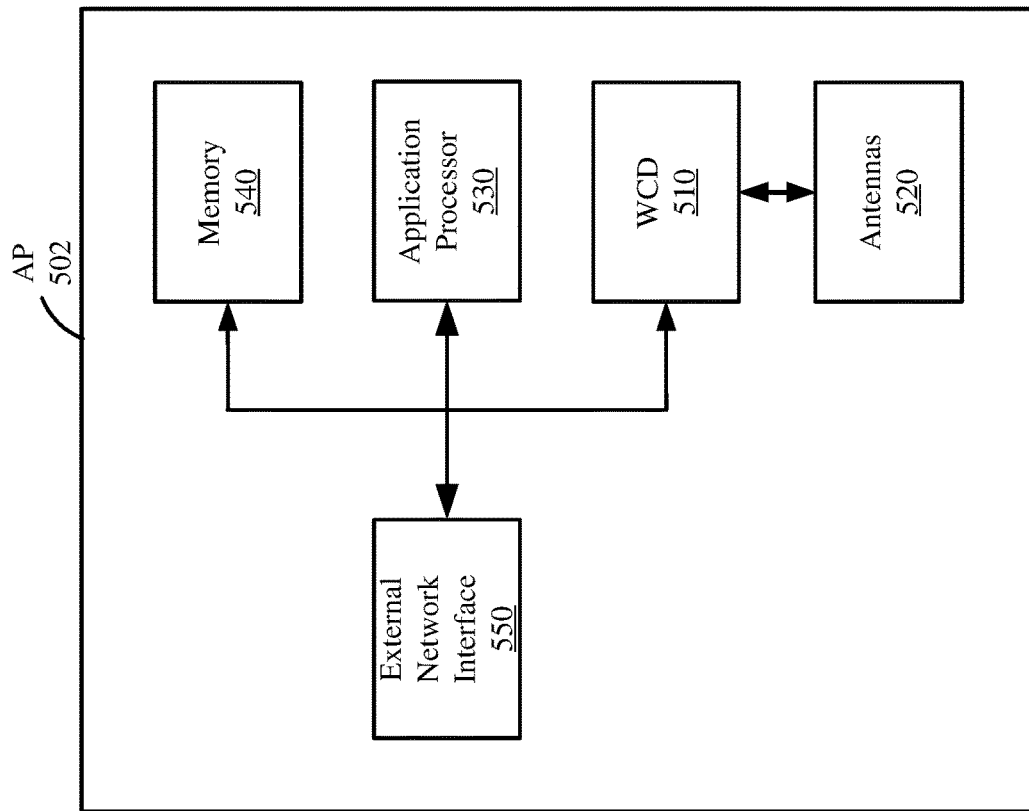
FIG. 5A shows a block diagram of an example AP.

FIG. 5A shows a block diagram of an example AP 502. For example, the AP 502 can be an example implementation of the AP 102 described with reference to FIG. 1. The AP 502 includes a wireless communication device (WCD) 510 (although the AP 502 may itself also be referred to generally as a wireless communication device as used herein). For example, the wireless communication device 510 may be an example implementation of the wireless communication device 400 described with reference to FIG. 4. The AP 502 also includes multiple antennas 520 coupled with the wireless communication device 510 to transmit and receive wireless communications. In some implementations, the AP 502 additionally includes an application processor 530 coupled with the wireless communication device 510, and a memory 540 coupled with the application processor 530. The AP 502 further includes at least one external network interface 550 that enables the AP 502 to communicate with a core network or backhaul network to gain access to external networks including the Internet. For example, the external network interface 550 may include one or both of a wired (for example, Ethernet) network interface and a wireless network interface (such as a WWAN interface). Ones of the aforementioned components can communicate with other ones of the components directly or indirectly, over at least one bus. The AP 502 further includes a housing that encompasses the wireless communication device 510, the application processor 530, the memory 540, and at least portions of the antennas 520 and external network interface 550.

FIG. 5B shows a block diagram of an example STA 504. For example, the STA 504 can be an example implementation of the STA 104 described with reference to FIG. 1. The STA 504 includes a wireless communication device 515 (although the STA 504 may itself also be referred to generally as a wireless communication device as used herein). For example, the wireless communication device 515 may be an example implementation of the wireless communication device 400 described with reference to FIG. 4. The STA 504 also includes one or more antennas 525 coupled with the wireless communication device 515 to transmit and receive wireless communications. The STA 504 additionally includes an application processor 535 coupled with the wireless communication device 515, and a memory 545 coupled with the application processor 535. In some implementations, the STA 504 further includes a user interface (UI) 555 (such as a touchscreen or keypad) and a display 565, which may be integrated with the UI 555 to form a touchscreen display. In some implementations, the STA 504 may further include one or more sensors 575 such as, for example, one or more inertial sensors, accelerometers, temperature sensors, pressure sensors, or altitude sensors. Ones of the aforementioned components can communicate with other ones of the components directly or indirectly, over at least one bus. The STA 504 further includes a housing that encompasses the wireless communication device 515, the application processor 535, the memory 545, and at least portions of the antennas 525, UI 555, and display 565.

As described above, many existing WLAN communication protocols utilize OFDM techniques, which tend to produce signals with relatively high PAPR. Wireless signals having high PAPR require large power backoffs for transmission. As such, high PAPR may impact the effective range or efficiency of OFDM transmissions. By contrast, single-carrier transmission techniques tend to produce wireless signals with significantly lower PAPR (compared to OFDM). Aspects of the present disclosure recognize that single-carrier transmission techniques can be used to boost the power of wireless signals without significantly increasing power consumption or reducing the efficiency of the power amplifier (compared to OFDM transmissions).

Various aspects relate generally to reducing PAPR in wireless communications, and more particularly, to SC-FDM techniques that can be used for wireless communications in WLANs. In some aspects, a wireless communication device may modulate a PPDU as a series of symbols in the time domain and may transform a subset of the time-domain symbols into a number (Q) of frequency-domain samples based on a Q-point DFT. In some implementations, Q may be an integer value that is only divisible by 2, 3, or 5. In some implementations, the wireless communication device may add one or more pilot symbols to the subset of time-domain symbols provided as inputs to the Q-point DFT. The wireless communication device maps the Q frequency-domain samples to a number (N) of orthogonal subcarriers (representing an OFDM symbol), where N>Q, and transforms the N subcarriers into N time-domain samples, based on an IFFT, for transmission over a wireless channel. In some aspects, the wireless communication device may further map one or more null values to one or more of the N subcarriers, respectively, where each of the one or more null subcarriers represents a DC subcarrier associated with a bandwidth of the wireless channel. In some aspects, the wireless communication device may map at least a portion of a PHY preamble (including an LTF) of the PPDU directly to the N subcarriers.

Particular implementations of the subject matter described in this disclosure can be implemented to realize one or more of the following potential advantages. By modulating a PPDU as a series of symbols in the time domain, aspects of the present disclosure can leverage the low PAPR properties of single-carrier waveforms to overcome path loss or extend the range of wireless communications in WLANs. Because the time-domain symbols are converted to the frequency domain and further mapped to OFDM symbols, such SC-FDM techniques can be implemented using existing WLAN (or OFDM) hardware. Aspects of the present disclosure recognize that many WLAN-capable devices also include hardware to support various 3GPP standards (such as LTE, 3G, 4G or 5G NR). Such hardware includes one or more Q-point DFTs, where Q is only divisible by 2, 3, or 5. Thus, by limiting the number (Q) of frequency-domain samples per OFDM symbol to numbers that are only divisible by 2, 3, or 5, the SC-FDM techniques of the present disclosure can further be implemented using existing 3GPP hardware. The tone plans associated with OFDM processing include pilot subcarriers that can be used for phase tracking in the frequency domain. However, mapping pilot values to particular subcarriers may increase the PAPR of the resulting signal. By contrast, inserting pilot symbols in the time domain allows phase tracking to be performed on the received signal without sacrificing the gains in PAPR associated with single-carrier transmissions. On the other hand, mapping null values directly to DC subcarriers allows frequency-domain processing for phase and DC offset correction (such as in accordance with existing WLAN protocols).

As described with reference to FIGS. 2A, 2B and 3, many existing PPDU formats include a PHY preamble 202 having legacy fields (such as L-STF 206, L-LTF 208, and L-SIG 210) and non-legacy fields 212. The legacy fields are common to different PPDU formats and provide backwards compatibility for legacy WLAN devices operating on carrier frequencies below 7 GHz (also referred to as "sub-7 GHz" frequency bands). However, new WLAN communication protocols are being developed to enable enhanced WLAN communication features (such as higher throughput and wider bandwidth) that require even higher carrier frequencies (such as in the 45 GHz or 60 GHz frequency bands). Aspects of the present disclosure recognize that there are currently no legacy WLAN devices operating at carrier frequencies above 7 GHz. Thus, in some aspects, a new "green field" PPDU format may be designed for wireless communications on carrier frequencies above 7 GHz. More specifically, the green field PPDU format may be optimized for communications on carrier frequencies above 7 GHz, for example, by reducing or eliminating redundant fields or signaling that would otherwise be included for backwards compatibility with legacy WLAN devices.

Figure 6:
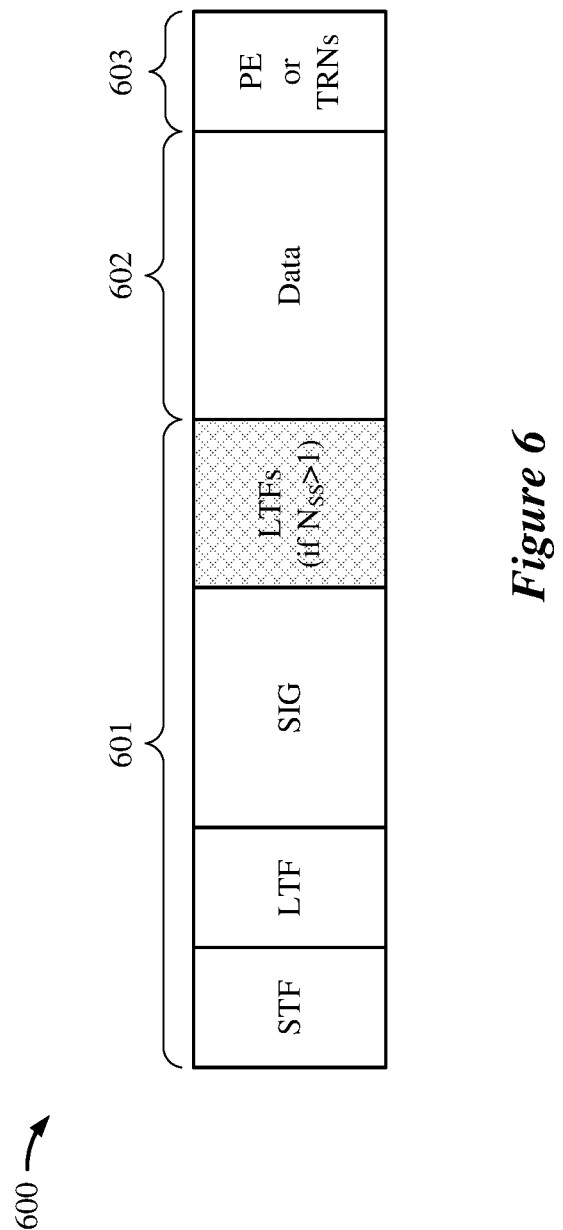
FIG. 6 shows an example PPDU usable for communications between an AP and one or more STAs, according to some implementations.

FIG. 6 shows an example PPDU 600 usable for communications between an AP and one or more STAs, according to some implementations. The PPDU 600 includes a PHY preamble 601 followed by a data portion 602 and a packet extension (PE) or one or more training fields (TRNs) 603. The PHY preamble 601 includes a short training field (STF), a long training field (LTF), and a signal (SIG) field. The STF may be used for packet detection, AGC, and timing or frequency offset estimation, whereas the LTF may be used for channel estimation (or fine timing and frequency offset estimation). In some implementations, the PHY preamble 601 may include one or more additional LTFs (following the SIG field) when the PPDU 600 is transmitted over multiple spatial streams ($N_{SS}$>1).

The SIG field may carry any information needed to interpret or demodulate the PPDU 600. Example demodulation information may include an indication of bandwidth, length, modulation and coding scheme (MCS), number of spatial streams ($N_{SS}$), BSS color, padding, PE ambiguity, or low density parity check (LDPC) extra symbol, among other examples. In some implementations, the SIG field also may carry beam management information indicating whether the PPDU 600 is associated with a beamforming training operation or various parameters associated with the beamforming training operation. Example beam management information may include a PPDU type, a training direction, a beam tracking request, a training length, a countdown, a sector ID, an antenna ID, a best antenna ID, a best sector ID, a number of RX sectors or RX antennas of the transmitting device, or a signal-to-noise ratio (SNR) report, among other examples.

Figure 7:
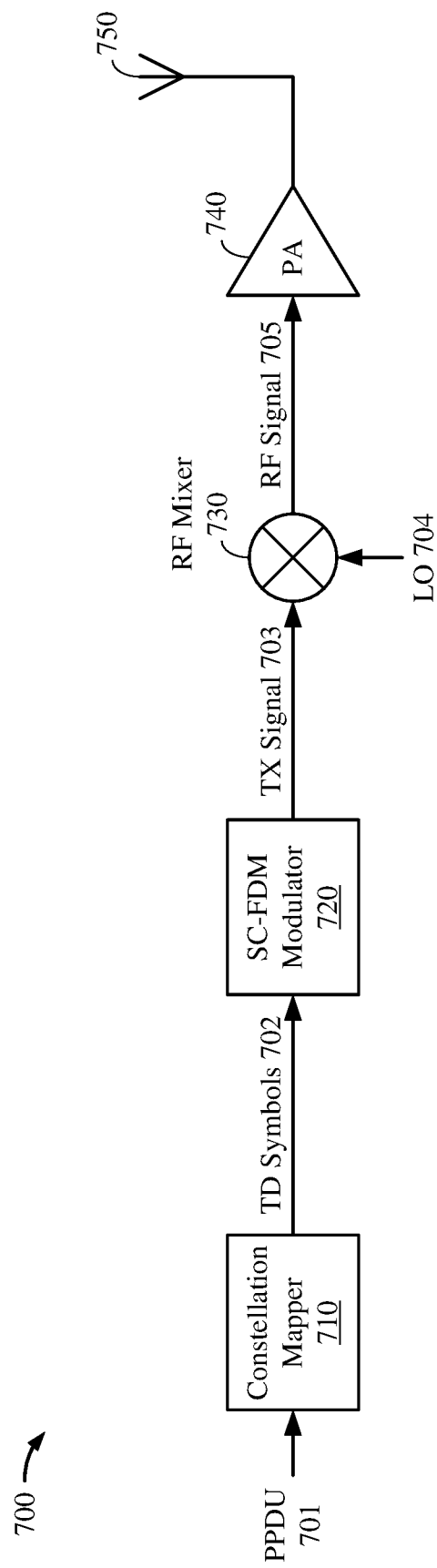
FIG. 7 shows a block diagram of an example transmit (TX) processing chain for a wireless communication device, according to some implementations.

FIG. 7 shows a block diagram of an example TX processing chain 700 for a wireless communication device, according to some implementations. In some aspects, the wireless communication device may be one example of the wireless communication device 400 of FIG. 4. The TX processing chain 700 is configured to process a PPDU 701 for transmission as an RF signal 705. In some implementations, the PPDU 701 may conform to an existing PPDU format used for wireless communications in sub-7 GHz frequency bands (such as described with reference to FIGS. 2A, 2B and 3). In some other implementations, the PPDU 701 may conform to a green field PPDU format designed for carrier frequencies above 7 GHz (such as the PPDU 600 of FIG. 6). For simplicity, only a single spatial stream of the TX processing chain 700 is depicted in FIG. 7. In actual implementations, the TX processing chain 700 may include any number of spatial streams.

The TX processing chain 700 includes a constellation mapper 710, an SC-FDM modulator 720, an RF mixer 730, and a power amplifier (PA) 740. The constellation mapper 710 maps the PPDU 701 to one or more time-domain (TD) symbols 702 associated with a modulation scheme. Example suitable modulation schemes include binary phase-shift keying (BPSK), quadrature phase-shift keying (QPSK), and quadrature amplitude modulation (QAM), among other examples. The SC-FDM modulator 720 modulates the TD symbols 702 onto a set of orthogonal subcarriers and converts the modulated subcarriers to a time-varying TX signal 703. The RF mixer 730 up-converts the TX signal 703 to a carrier frequency, and the power amplifier 740 amplifies the resulting RF signal 705 for transmission via one or more antennas 750. For example, the RF mixer 730 may modulate the TX signal 703 onto a local oscillator (LO) signal 704 that oscillates at the carrier frequency.

In some aspects, existing WLAN hardware may be repurposed to support single-carrier transmissions of PPDUs. For example, the SC-FDM modulator 720 may transform the TD symbols 702 into frequency-domain (FD) samples that can be mapped to the set of orthogonal subcarriers. In some implementations, the SC-FDM modulator 720 may reuse existing OFDM hardware to map the FD samples onto the orthogonal subcarriers and convert the orthogonal subcarriers to the TX signal 703. As such, the SC-FDM modulator 720 may preserve the single-carrier properties associated with the TD symbols 702 (such as low PAPR) while leveraging OFDM techniques to transmit the TD symbols 702 over a wireless channel. More specifically, the SC-FDM modulator 720 reduces the PAPR of the RF signal 705 (compared to conventional OFDM transmissions) and thereby reduces the power backoff required by the power amplifier 740. As a result, the power amplifier 740 can operate more efficiently, for example, to boost the power of the RF signal 705. Such boosting of the RF signal 705 can be used to extend the range of wireless communications or overcome path loss at higher carrier frequencies.

Figure 8:
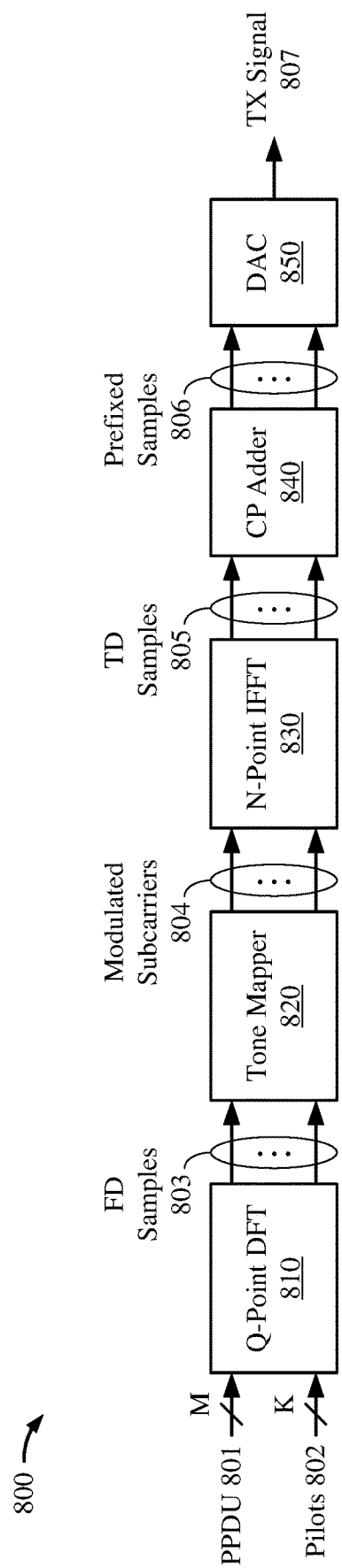
FIG. 8 shows a block diagram of an example single-carrier frequency-division multiplexing (SC-FDM) modulation system, according to some implementations.

FIG. 8 shows a block diagram of an example SC-FDM modulation system 800, according to some implementations. In some aspects, the SC-FDM modulation system 800 may be configured to modulate a PPDU 801 onto a TX signal 807. More specifically, the SC-FDM modulation system 800 may convert the PPDU 801 from the time domain to the frequency domain so that the resulting TX signal 807 can be transmitted using OFDM techniques while preserving the single-carrier properties of the PPDU 801 in the time domain. In some implementations, the SC-FDM modulation system 800 may be one example of the SC-FDM modulator 720 of FIG. 7. With reference to FIG. 7, the PPDU 801 may be one example of the TD symbols 702 and the TX signal 807 may be one example of the TX signal 703.

The SC-FDM modulation system 800 includes a Q-point DFT 810, a tone mapper 820, an N-point IFFT 830, a CP adder 840, and a DAC 850. The Q-point DFT 810 converts the PPDU 801 from the time domain to the frequency domain. In some aspects, the Q-point DFT 810 may transform a number (M) of data symbols associated with the PPDU 801 (such as the TD symbols 702 of FIG. 7) into a number (Q) of frequency-domain (FD) samples 803. For example, Q may represent the size of a resource unit (RU) or multiple-RU (M-RU) to which the FD samples 803 are mapped. In some implementations, a number (K) of pilot symbols also may be provided as inputs to the Q-point DFT 810 (where M+K=Q). The pilot symbols may be associated with a phase tracking operation that can be performed in the time domain by a receiving device. Aspects of the present disclosure recognize that the OFDM tone plans associated with existing versions of the IEEE 802.11 standard specify a number of pilot subcarriers for a given RU size. In some implementations, K may equal to the number of pilot subcarriers specified by an existing OFDM tone plan for the size of the RU or M-RU to which the FD samples 803 are mapped.

In some implementations, Q may be an integer value equal to the size of any RU or M-RU defined by existing versions of the IEEE 802.11 standard (such as 26, 52, 52+26, 106, 106+26, 242, 484, 484+242, 996, 996+484, 996×2, 996×2+484, 996×3, 996×3+484, or 996×4). In some other implementations, Q may be an integer value that is only divisible by 2, 3, or 5. In such implementations, the sizes of existing RUs or M-RUs may be reduced or increased to the nearest multiple of 2, 3, or 5. For example, a 26-subcarrier RU may be reduced to 25 subcarriers, a 52-subcarrier RU may be reduced to 50 subcarriers, a 106-subcarrier RU may be reduced to 100 subcarriers, a 132-subcarrier RU may be reduced to 128 subcarriers, a 242-subcarrier RU may be reduced to 240 subcarriers, a 484-subcarrier RU may be reduced to 480 subcarriers, a 726-subcarrier RU may be reduced to 720 subcarriers, and a 996-subcarrier RU may be reduced to 972 subcarriers. In some implementations, the reduced RU size may result in fewer pilot symbols being provided as inputs to the Q-point DFT 810. For example, a 480-subcarrier RU may be associated with 12 pilot symbols (in contrast with 16 pilot subcarriers associated with a 484-subcarrier RU). In some other implementations, the RU size may be increased by adding one or more "unused" subcarriers (such as any subcarriers spanning a given bandwidth that are not assigned to an RU or M-RU according to an existing OFDM tone plan). For example, a 26-subcarrier RU may be expanded to 27 subcarriers by adding one or more unused subcarriers associated with a 20 MHz tone plan.

The tone mapper 820 maps the FD samples 803 to a number (N) of subcarriers to produce modulated subcarriers 804. The N subcarriers may represent an OFDM symbol in the frequency domain. In other words, the N subcarriers may span a bandwidth associated with a wireless channel on which the TX signal 807 is transmitted. In some aspects, N may be greater than Q. Accordingly, the tone mapper 820 may map the FD samples 803 to a subset of the N subcarriers representing a Q-subcarrier RU or M-RU spanning a portion of the channel bandwidth. In some implementations, the remaining N-Q subcarriers may be left unused. In some other implementations, at least some of the remaining N-Q subcarriers may be modulated with data associated with another RU or M-RU (such as in accordance with OFDMA). The N-point IFFT 830 transforms the modulated subcarriers 804, from the frequency domain to the time domain, as N time-domain (TD) samples 805. The CP adder 840 adds a cyclic prefix to the N time-domain samples 805 to produce a number of prefixed samples 806. The DAC 850 converts the prefixed samples 806 to the TX signal 807.

Existing PPDU formats include PHY preambles that are designed to be processed in the frequency domain. For example, existing versions of the IEEE 802.11 standard define STF and LTF sequences that are mapped to particular subcarrier indices associated with an existing OFDM tone plan. In some aspects, at least a portion of the PHY preamble of the PPDU 801 may be mapped directly to the N subcarriers in the frequency domain. For example, the PHY preamble may be input directly to the tone mapper 820 (bypassing the Q-point DFT 810), which maps the PHY preamble to the same RU or M-RU as the data portion of the PPDU 801. As such, aspects of the present disclosure can reuse existing PHY preamble designs for PPDUs that transmitted using SC-FDM. However, as described above, mapping frequency-domain symbols to specific subcarriers can increase the PAPR of the PPDU 801. In particular, aspects of the present disclosure recognize that existing LTF sequences associated with large M-RUs (such as 484+252-subcarrier M-RUs) may create PAPR bottlenecks. For example, the high PAPRs associated with such LTF sequences may cause the power amplifier (such as the PA 740 of FIG. 7) to operate in the saturation region, thereby distorting the TX signal 807.

In some aspects, existing LTF sequences may be mapped to one or more LTFs in the PHY preamble of the PPDU 801. In some implementations, the LTF(s) may be repeated (in the time domain) to compensate for the loss in channel estimation due to distortion of the TX signal 807. In such implementations, the number of LTFs in the PHY preamble may be greater than the number of spatial streams on which the PPDU 801 is transmitted. In some other implementations, the LTF symbols may be modified (in a manner that is agnostic to the receiver) to reduce the PAPR associated with the PPDU 801. Example modifications may include, among other examples, applying different phase rotations to each component RU (in an M-RU) or mapping non-zero values (with special scaling) to one or more DC subcarriers.

In some other aspects, new LTF sequences may be designed for PPDUs that are transmitted using SC-FDM. Such LTF sequences may be referred to herein as "SC-LTF" sequences. In some implementations, an SC-LTF sequence may be modulated in accordance with higher-order modulation schemes (higher than BPSK) to reduce the PAPR of the PPDU 801 in the time domain. In some other implementations, an SC-LTF sequence may be constructed based on a Zadoff-Chu sequence. For example, each value (x) of the Zadoff-Chu sequence can be expressed as a function of its sequence index (m), a root index (u), and a sequence length (N), as shown in Equation 1:

$$x(m) = e^{-j\frac{\pi um(m+1)}{N}} \qquad (1)$$

Aspects of the present disclosure recognize that the Zadoff-Chu sequence in Equation 1 exhibits time-frequency duality for prime values of the sequence length N. In other words, the time-domain values of the Zadoff-Chu sequence (input to a DFT) follow the same (circular) pattern or distribution as the frequency-domain values of the Zadoff-Chu sequence (output by a DFT). Thus, by mapping a Zadoff-Chu sequence having a prime length N to the LTFs of the PPDU 801, aspects of the present disclosure may reduce the PAPR of the PPDU 801 in both the time domain and the frequency domain.

In some implementations, the length N of the Zadoff-Chu sequence may be associated with the size of the RU or M-RU to which the PPDU 801 is mapped. In such implementations, N may be set to the largest prime number not exceeding the number of subcarriers in the associated RU or M-RU and the Zadoff-Chu sequence may be extended, by a cyclically-shifted copy, to equal the number of subcarriers in the RU or M-RU. As such, different sized RUs and M-RUs may be associated with different values of N. Table 1 summarizes example sequence lengths N that can be associated with various RU sizes.

TABLE 1

| RU Size | Zadoff-Chu Sequence Length (N) |
|---|---|
| 26 | 23 |
| 52 | 47 |
| 52 + 26 | 73 |
| 106 | 103 |
| 106 + 26 | 131 |
| 242 | 241 |
| 484 | 479 |
| 484 + 242 | 719 |
| 996 | 991 |
| 996 + 484 | 1471 |
| 996 × 2 | 1987 |
| 996 × 2 + 484 | 2473 |
| 996 × 3 | 2971 |
| 996 × 3 + 484 | 3469 |
| 996 × 4 | 3967 |

In some other implementations, the length N of the Zadoff-Chu sequence may be associated with the bandwidth of the wireless channel on which the PPDU 801 (or the TX signal 807) is transmitted. In such implementations, N may be set to the largest prime number not exceeding the total number of subcarriers spanning the bandwidth of the wireless channel and the Zadoff-Chu sequence may be extended, by a cyclically-shifted copy, to equal the number of subcarriers spanning the channel bandwidth. As such, the values of the Zadoff-Chu sequence mapped to each RU or M-RU may depend on the subcarrier indices spanned by the RU or M-RU. Table 2 summarizes example sequence lengths N that can be associated with various bandwidths.

TABLE 2

| # Subcarriers Spanning Bandwidth | Zadoff-Chu Sequence Length (N) |
|---|---|
| 242 | 241 |
| 484 | 479 |
| 996 | 991 |
| 996 × 2 | 1987 |
| 996 × 4 | 3967 |

Figure 9A:
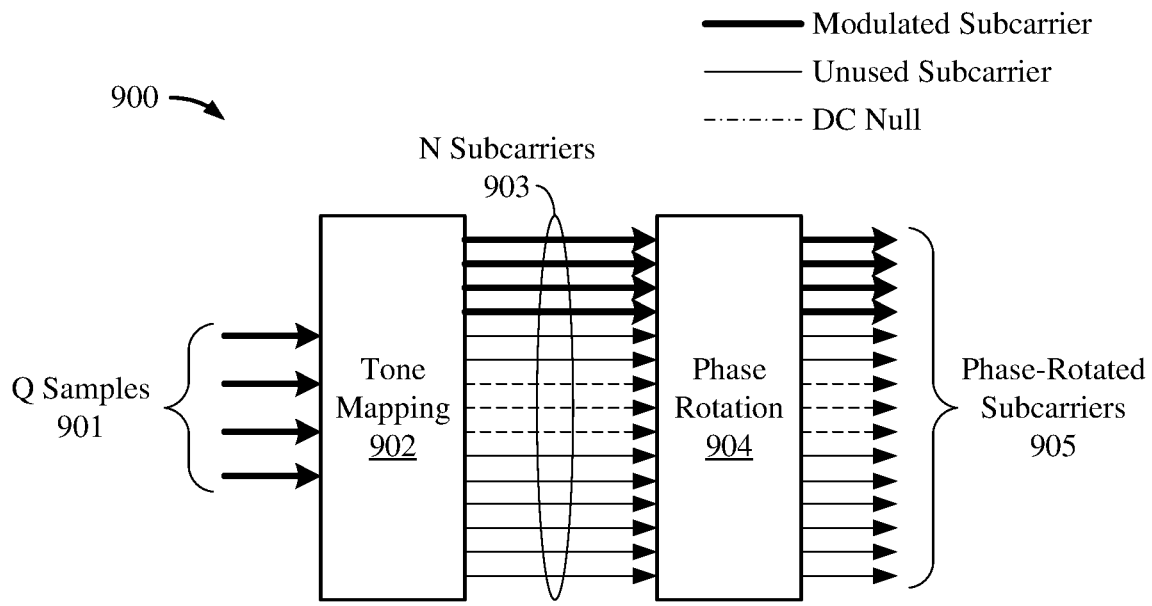
FIG. 9A shows a block diagram of an example interface for modulating single-carrier data onto orthogonal subcarriers, according to some implementations.

FIG. 9A shows a block diagram of an example interface 900 for modulating single-carrier data onto orthogonal subcarriers, according to some implementations. In some implementations, the interface 900 may be one example of the tone mapper 820 of FIG. 8. The interface 900 includes a tone mapping component 902 and a phase rotation component 904. The tone mapping component 902 maps a number (Q) of samples 901 to a number (N) of subcarriers 903 in the frequency domain (where N>Q). With reference to FIG. 8, the Q samples 901 may be one example of the FD samples 803. Thus, the Q samples 901 may represent a series of data symbols associated with a PPDU and a number of pilot symbols in the time domain. In the example of FIG. 9A, the tone mapping component 902 is configured to modulate the Q samples 901 onto Q contiguous subcarrier indices associated with the N subcarriers. For example, the Q contiguous subcarrier indices may represent an RU or M-RU. The remaining N-Q subcarriers may be left unused or modulated with samples associated with other RU or M-RUs (not shown for simplicity).

In some aspects, the tone mapping component 902 may further map one or more null values to one or more subcarrier indices, respectively, associated with DC subcarriers. For example, such subcarrier indices may represent DC subcarriers associated with a bandwidth of the wireless channel and may be used for DC offset correction by a receiving device. In some implementations, the number of DC subcarriers inserted by the tone mapping component 902 may be equal to the number of DC subcarriers specified by an existing OFDM tone plan for the given channel bandwidth. Aspects of the present disclosure recognize that inserting DC subcarriers directly in the frequency domain may increase the PAPR of the resulting signal. In some implementations, the phase rotation component 904 may apply a series of phase rotations to the N subcarriers 903 that mitigates the PAPR associated with the DC subcarriers. In other words, the phase rotation component 904 may produce N phase-rotated subcarriers 905 associated with a lower PAPR than the N subcarriers 903. With reference to FIG. 8, the phase-rotated subcarriers 905 may be one example of the modulated subcarriers 804.

Figure 9B:
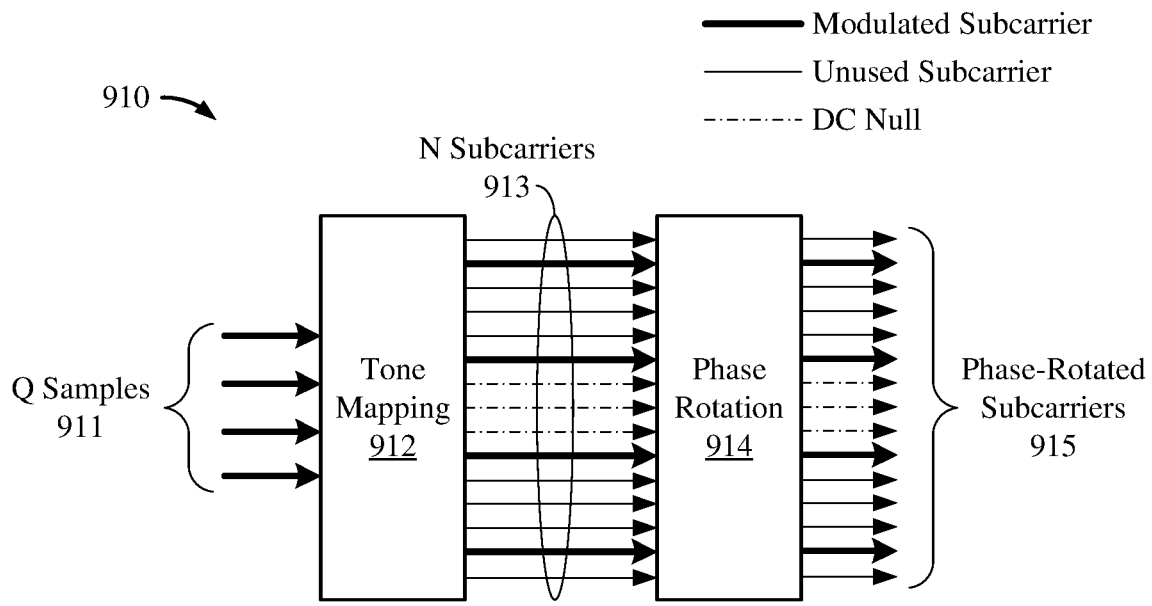
FIG. 9B shows another block diagram of an example interface for modulating single-carrier data onto orthogonal subcarriers, according to some implementations.

FIG. 9B shows another block diagram of an example interface 910 for modulating single-carrier data onto orthogonal subcarriers, according to some implementations. In some implementations, the interface 910 may be one example of the tone mapper 820 of FIG. 8. The interface 910 includes a tone mapping component 912 and a phase rotation component 914. The tone mapping component 912 maps a number (Q) of samples 911 to a number (N) of subcarriers 913 in the frequency domain (where N>Q). With reference to FIG. 8, the Q samples 911 may be one example of the FD samples 803. Thus, the Q samples 911 may represent a series of data symbols associated with a PPDU and a number of pilot symbols in the time domain. In the example of FIG. 9B, the tone mapping component 902 is configured to modulate the Q samples 901 onto Q noncontiguous subcarrier indices associated with the N subcarriers. For example, the Q noncontiguous subcarrier indices may represent an RU or M-RU (or a distributed RU). The remaining N-Q subcarriers may be left unused or modulated with samples associated with other RU or M-RUs (not shown for simplicity).

In some aspects, the tone mapping component 912 may further map one or more null values to one or more subcarrier indices, respectively, associated with DC subcarriers. For example, such subcarrier indices may represent DC subcarriers associated with a bandwidth of the wireless channel and may be used for DC offset correction by a receiving device. In some implementations, the number of DC subcarriers inserted by the tone mapping component 912 may be equal to the number of DC subcarriers specified by an existing OFDM tone plan for the given channel bandwidth. Aspects of the present disclosure recognize that inserting DC subcarriers directly in the frequency domain may increase the PAPR of the resulting signal. In some implementations, the phase rotation component 914 may apply a series of phase rotations to the N subcarriers 913 that mitigates the PAPR associated with the DC subcarriers. In other words, the phase rotation component 914 may produce N phase-rotated subcarriers 915 associated with a lower PAPR than the N subcarriers 913. With reference to FIG. 8, the phase-rotated subcarriers 915 may be one example of the modulated subcarriers 804.

Figure 10:
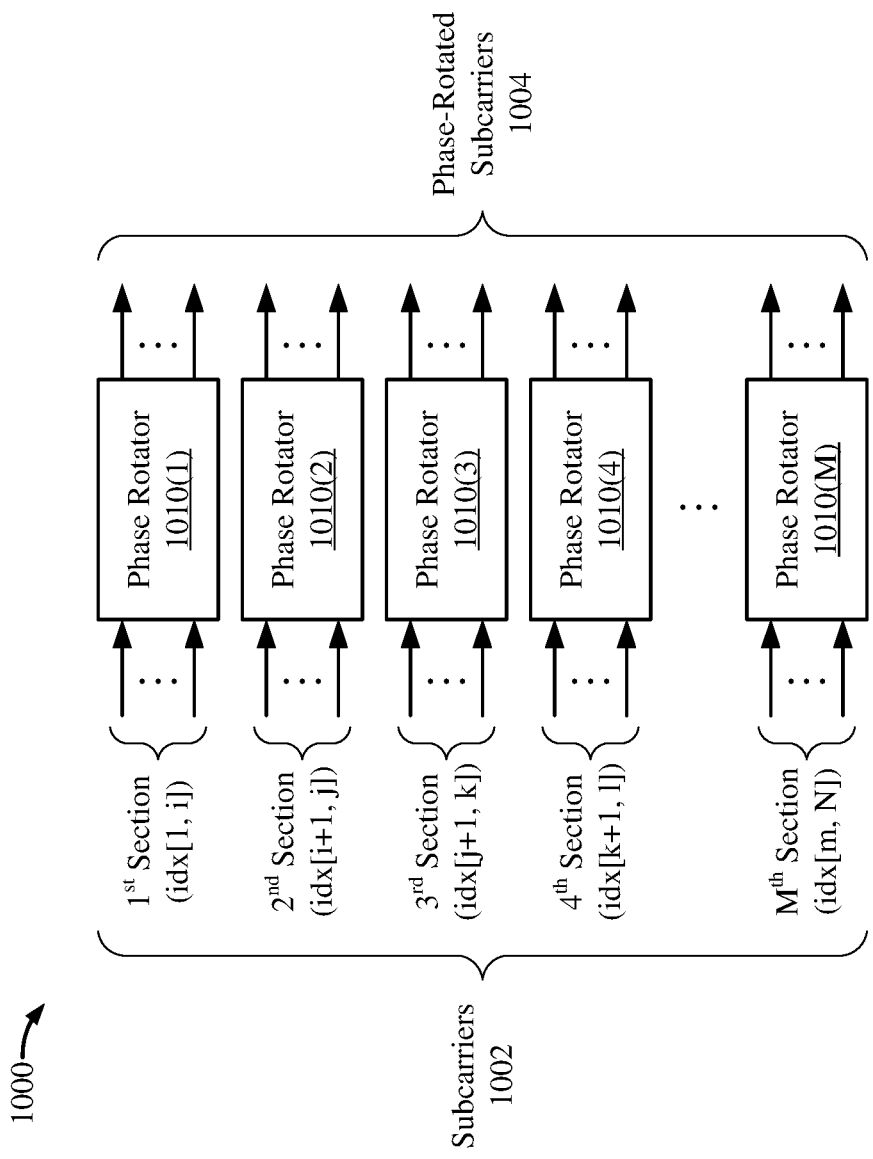
FIG. 10 shows a block diagram of an example subcarrier phase adjustment system, according to some implementations.

FIG. 10 shows a block diagram of an example subcarrier phase adjustment system 1000, according to some implementations. More specifically, the phase adjustment system 1000 may support $\pi/2$-BPSK modulation. In some implementations, the phase adjustment system 1000 may be one example of the phase rotation component 914 of FIG. 9. Thus, the phase adjustment system 1000 may apply a series of phase rotations to a number (N) of subcarriers 1002 to produce N phase-rotated subcarriers 1004. With reference to FIG. 9, the N subcarriers 1002 may be on example of the N subcarriers 913 and the phase-rotated subcarriers 1004 may be one example of the phase-rotated subcarriers 915.

The phase adjustment system 1000 includes a number (M) of phase rotators 1010(1)-1010(M). Each of the phase rotators 1010(1)-1010(M) applies a set of phase rotations to a respective subset (or "section") of the N subcarriers 1002. More specifically, the N subcarriers 1002 may be relatively evenly distributed among the M sections, in order of increasing subcarrier index, so that each section includes substantially the same number of subcarriers 1002. As shown in FIG. 10, the subcarrier sections are numbered (or indexed) from 1 to M. The subcarriers 1002 in the $1^{st}$ section are associated with consecutive subcarrier indices 1 through i; the subcarriers 1002 in the $2^{nd}$ section are associated with consecutive subcarrier indices i+1 through j; the subcarriers 1002 in the $3^{rd}$ section are associated with consecutive subcarrier indices j+1 through k; the subcarriers 1002 in the $4^{th}$ section are associated with consecutive subcarrier indices k+1 through l; and the subcarriers 1002 in the $M^{th}$ section are associated with consecutive subcarrier indices m through N.

In some aspects, the phase adjustment system 1000 may apply a different pattern of phase rotations to the subcarriers 1002 in odd-numbered sections (such as the $1^{st}$ and $3^{rd}$ sections) than the subcarriers 1002 in even-numbered sections (such as the $2^{nd}$ and $4^{th}$ sections). For example, each of the phase rotators 1010(1) and 1010(3) may apply a series of first phase rotations to the subcarriers 1002 in the $1^{st}$ and $3^{rd}$ sections, respectively, and each of the phase rotators 1010(2) and 1010(4) may apply a series of second phase rotations to the subcarriers 1002 in the $2^{nd}$ and $4^{th}$ sections, respectively, where the series of first phase rotations is different than the series of second phase rotations.

In some implementations, the phase rotators associated with odd-numbered sections may apply a 90° phase shift to every other subcarrier 1002 beginning with the second subcarrier index in its respective section (which results in a phase rotation pattern [1 i 1 i . . . ] being applied across the range of subcarrier indices spanning each odd-numbered section). For example, the phase rotator 1010(1) may apply a 90° phase shift to the subcarriers 1002 associated with subcarrier index 2 and every other subcarrier index thereafter spanning the $1^{st}$ section. Similarly, the phase rotator 1010(3) may apply a 90° phase shift to the subcarriers 1002 associated with subcarrier index j+2 and every other subcarrier index thereafter spanning the $3^{rd}$ section.

In some implementations, the phase rotators associated with even-numbered sections may apply a 90° phase shift to every other subcarrier 1002 beginning with the first subcarrier index in its respective section (which results in a phase shift pattern [i 1 i 1 . . . ] being applied across the range of subcarrier indices spanning each even-numbered section). For example, the phase rotator 1010(2) may apply a 90° phase shift to the subcarriers 1002 associated with subcarrier index i+1 and every other subcarrier index thereafter spanning the $2^{nd}$ section. Similarly, the phase rotator 1010(4) may apply a 90° phase shift to the subcarriers 1002 associated with subcarrier index k+1 and every other subcarrier index thereafter spanning the $4^{th}$ section.

As an example, the phase adjustment system 1000 may subdivide a 242-subcarrier OFDM symbol (N=242) into 60 substantially equal sections (M=60). For example, of the 60 subcarrier sections, 58 sections may be assigned 4 subcarriers each and the remaining 2 sections may be assigned 5 subcarriers each. Each phase rotator associated with an odd-numbered section may apply a pattern of phase rotations [1 i 1 i] or [1 i 1 i 1] to the 4 or 5 subcarriers, respectively, in its section and each phase rotator associated with an even-numbered section may apply a pattern of phase rotations [i 1 i 1] or [i 1 i 1 i] to the 4 or 5 subcarriers, respectively, in its section.

Thus, given 242 subcarriers divided into 60 sections, the phase adjustment system 1000 may apply a 90° phase shift to the subcarriers associated with the subcarrier indices: 2, 4, 5, 7, 10, 12, 13, 15, 18, 20, 21, 23, 26, 28, 29, 31, 34, 36, 37, 39, 42, 44, 45, 47, 50, 52, 53, 55, 58, 60, 61, 63, 66, 68, 69, 71, 74, 76, 77, 79, 82, 84, 85, 87, 90, 92, 93, 95, 98, 100, 101, 103, 106, 108, 109, 111, 114, 116, 117, 119, 121, 122, 124, 126, 127, 129, 132, 134, 135, 137, 140, 142, 143, 145, 148, 150, 151, 153, 156, 158, 159, 161, 164, 166, 167, 169, 172, 174, 175, 177, 180, 182, 183, 185, 188, 190, 191, 193, 196, 198, 199, 201, 204, 206, 207, 209, 212, 214, 215, 217, 220, 222, 223, 225, 228, 230, 231, 233, 236, 238, 239, and 241.

Figure 11:
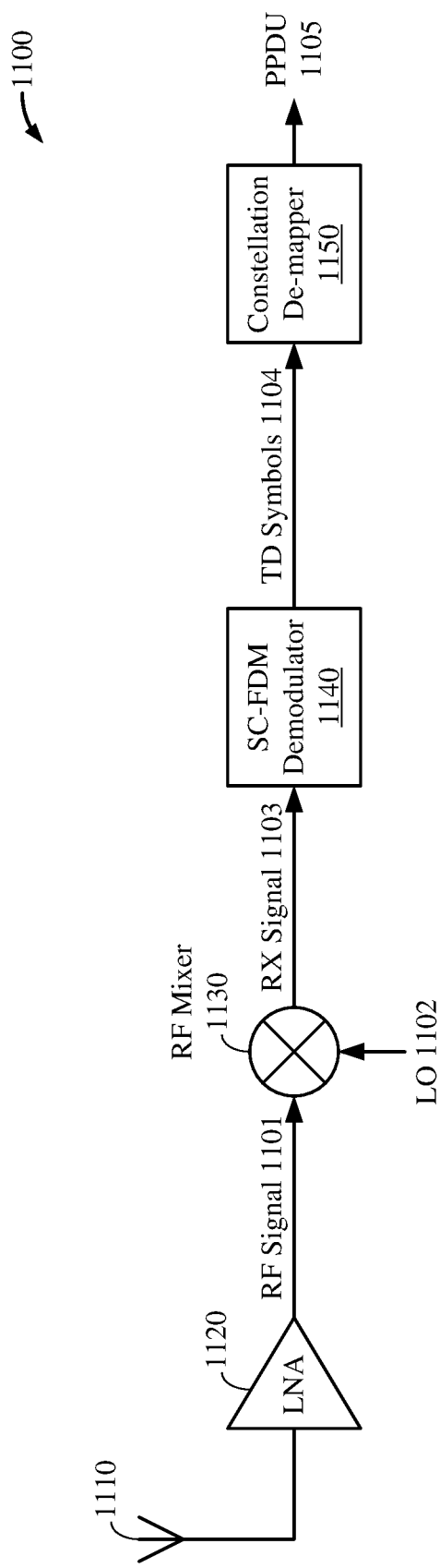
FIG. 11 shows a block diagram of an example receive (RX) processing chain for a wireless communication device, according to some implementations.

FIG. 11 shows a block diagram of an example RX processing chain 1100 for a wireless communication device, according to some implementations. In some aspects, the wireless communication device may be one example of the wireless communication device 400 of FIG. 4. The RX processing chain 1100 is configured to recover a PPDU 1105 from a received RF signal 1101. In some implementations, the PPDU 1105 may conform to an existing PPDU format used for wireless communications in sub-7 GHz frequency bands (such as described with reference to FIGS. 2A, 2B, and 3). In some other implementations, the PPDU 1105 may conform to a green field PPDU format designed for carrier frequencies above 7 GHz (such as the PPDU 600 of FIG. 6). For simplicity, only a single spatial stream of the RX processing chain 1100 is depicted in FIG. 11. In actual implementations, the RX processing chain 1100 may include any number of spatial streams.

The RX processing chain 1100 includes a low-noise amplifier (LNA) 1120, an RF mixer 1130, an SC-FDM demodulator 1140, and a constellation de-mapper 1150. The LNA 1120 amplifies the RF signal 1101 received via one or more antennas 1110, and the RF mixer 1130 down-converts the RF signal 1101 to a baseband RX signal 1103. For example, the RF mixer 1130 may demodulate the RF signal 1101 based on an LO signal 1102 that oscillates at a carrier frequency. The SC-FDM demodulator 1140 demodulates the RX signal 1103 as one or more time-domain (TD) symbols 1104 associated with a modulation scheme. In some implementations, the SC-FDM demodulator 1140 may reverse the modulation performed by the SC-FDM modulator 720 of FIG. 7. The constellation de-mapper 1150 de-maps the TD symbols 1104 to recover the PPDU 1105. In some implementations, the constellation de-mapper 1150 may reverse the mapping performed by the constellation mapper 710 of FIG. 7.

Figure 12:
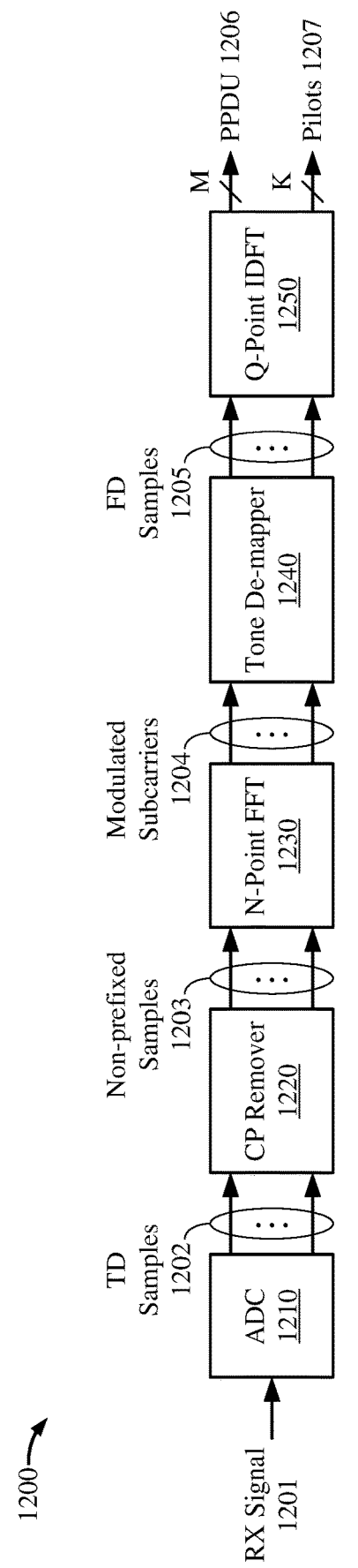
FIG. 12 shows a block diagram of an example SC-FDM demodulation system, according to some implementations.

FIG. 12 shows a block diagram of an example SC-FDM demodulation system 1200, according to some implementations. In some aspects, the SC-FDM demodulation system 1200 may be configured to recover a PPDU 1206 from an RX signal 1201. More specifically, the SC-FDM demodulation system 1200 may reverse the modulation performed by the SC-FDM demodulation system 800 of FIG. 8. In some implementations, the SC-FDM demodulation system 1200 may be one example of the SC-FDM demodulator 1140 of FIG. 11. With reference to FIG. 11, the RX signal 1201 may be one example of the RX signal 1103 and the PPDU 1206 may be one example of the TD symbols 1104.

The SC-FDM demodulation system 1200 includes an ADC 1210, a CP remover 1220, an N-point fast Fourier transform (FFT) 1230, a tone de-mapper 1240, and a Q-point inverse discrete Fourier transform (IDFT) 1250. The ADC 1210 converts the RX signal 1201 to a set of time-domain (TD) samples 1202. In some aspects, the ADC 1210 may operate at the same sampling rate as the DAC 850 of FIG. 8. The CP remover 1220 removes a cyclic prefix from the TD samples 1202 to produce a number (N) of non-prefixed samples 1203. The N-point FFT 1230 transforms the N non-prefixed samples 1203, from the time domain to the frequency domain, as N modulated subcarriers 1204.

The tone de-mapper 1240 is configured to perform equalization and de-map the modulated subcarriers 1204 to a number (Q) of frequency-domain (FD) samples 1205. In some aspects, the tone de-mapper 1240 may reverse the mapping performed by the tone mapper 820 of FIG. 8 or any of the interfaces 900 or 910 of FIGS. 9A and 9B, respectively. For example, the tone de-mapper 1240 may acquire the FD samples 1205 from a subset of the N modulated subcarriers 1204 representing a Q-subcarrier RU or M-RU (where N>Q). In some implementations, the tone de-mapper 1240 may recover a portion of the PHY preamble (such as a SIG field) of the PPDU 1206 from the FD samples 1205.

The Q-point IDFT 1250 transforms the FD samples 1205, from the frequency domain to the time domain, to recover the PPDU 1206. In some aspects, the Q-point IDFT 1250 may reverse the time-to-frequency domain conversion performed by the Q-point DFT 810 of FIG. 8. As such, the FD samples 1205 may be transformed into a number (M) of data symbols associated with the PPDU 1206 and a number (K) of pilot symbols 1207 in the time domain (where M+K=Q). In some implementations, the wireless communication device) may further perform a phase tracking operation, in the time domain, based on the recovered pilot symbols 1207. More specifically, the wireless communication device may estimate (and correct) phase errors in the received PPDU 1206 by comparing the values of the pilot symbols 1207 to their ideal (or known) values.

For example, the value of the received signal ($R_{m,n}$) modulated on the $m^{th}$ subcarrier index of the $n^{th}$ OFDM symbol (such as at the output of the N-point FFT 1230) can be expressed as a function of the transmitted signal ($X_{m,n}$), the per-subcarrier channel ($H_m$), phase noise ($e^{j\theta}$), and noise ($N_{m,n}$):

$$R_{m,n} = H_m e^{j\theta} X_{m,n} + N_{m,n}$$

The value of each sample ($y_{m,n}$) after equalization and conversion to the time domain (such as at the output of the Q-point IDFT 1250) can be expressed as:

$$y_{m,n} = IDFT\left(\frac{R_{m,n} \hat{H}_m^* e^{j(\theta - \hat{\theta}_H)}}{|\hat{H}_m|^2}\right)$$

More specifically, the sampled values coinciding with the timing ($t_{m,n}$) of the pilot symbols can be expressed as a function of the of the ideal pilot symbol values (p) transmitted at such times and the time-domain noise (v):

$$y_{m,n} = p e^{j(\theta - \hat{\theta}_H) t_{m,n}} + v$$

The phase slope or offset ($\hat{\emptyset}$) between the $m^{th}$ and $k^{th}$ pilot symbols can thus be expressed as:

$$\hat{\emptyset} = \theta - \hat{\theta}_H = \frac{\text{angle}(y_{m,n} p^*) - \text{angle}(y_{k,n} p^*)}{t_{m,n} - t_{k,n}}$$

In some implementations, the wireless communication device may use one or more data symbols (associated with the PPDU 1206) to further enhance or improve the accuracy of the phase offset estimation (for example, by comparing the values of the received data symbols with hard-decision values of the data symbols for reference). In some implementations, the wireless communication device may use the phase estimate $\hat{\emptyset}$ to correct the phase of each data symbol in the current OFDM symbol. In some other implementations, the wireless communication device may use the phase estimate $\hat{\emptyset}$ to correct the phase of each data symbol in a subsequent OFDM symbol.

Figure 13A:
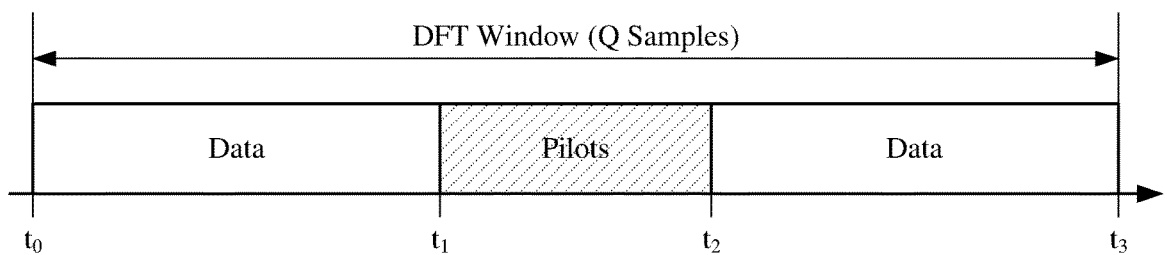
FIG. 13A shows a timing diagram depicting an example sequence of time-domain symbols spanning a Q-point discrete Fourier transform (DFT) window.

FIG. 13A shows a timing diagram 1300 depicting an example sequence of time-domain symbols spanning a Q-point DFT window. As shown in FIG. 13A, the Q-point DFT window spans a duration from times $t_0$ to $t_3$. The sequence of time-domain symbols includes a number (K) of pilot symbols interspersed between a number (M) of data symbols (where M+K=Q). In some implementations, the M data symbols and the K pilot symbols may be examples of the PPDU 801 and the pilot symbols 802, respectively, of FIG. 8 (or the PPDU 1206 and the pilot symbols 1207, respectively, of FIG. 12). In the example of FIG. 13A, the pilot symbols are concentrated in the middle of the time-domain sequence, such as between times $t_1$ and $t_2$, and the data symbols are distributed between times $t_0$ to $t_1$ and between times $t_2$ to $t_3$.

In some implementations, a receiving device may estimate the slope of a phase ramp $\hat{\emptyset}$ associated with the received sequence of time-domain symbols based on the pilot symbols received between times $t_1$ and $t_2$ (such as described with reference to FIG. 12). The receiving device may further use the phase estimate $\hat{\emptyset}$ to correct the phases of the data symbols received between times $t_0$ and $t_1$ and between times $t_2$ and $t_3$.

Figure 13B:
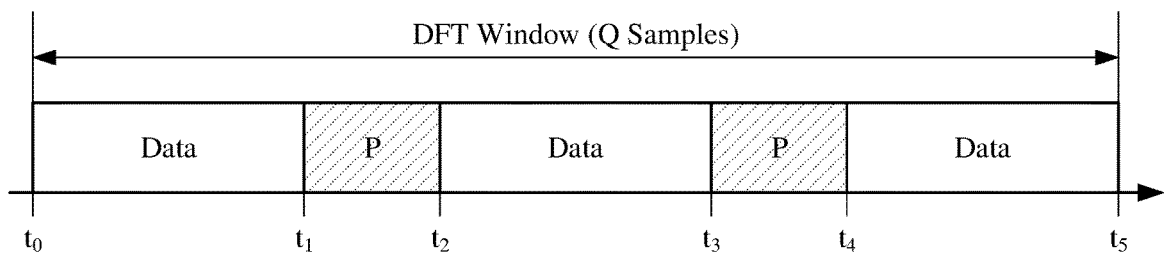
FIG. 13B shows another timing diagram depicting an example sequence of time-domain symbols spanning a Q-point DFT window.

FIG. 13B shows another timing diagram 1310 depicting an example sequence of time-domain symbols spanning a Q-point DFT window. As shown in FIG. 13B, the Q-point DFT window spans a duration from times $t_0$ to $t_5$. The sequence of time-domain symbols includes a number (K) of pilot symbols interspersed between a number (M) of data symbols (where M+K=Q). In some implementations, the M data symbols and the K pilot symbols may be examples of the PPDU 801 and the pilot symbols 802, respectively, of FIG. 8 (or the PPDU 1206 and the pilot symbols 1207, respectively, of FIG. 12). Compared to the pilot symbols of FIG. 13A, the pilot symbols in FIG. 13B are more evenly distributed within the time-domain sequence, such as between times $t_1$ and $t_2$ and between times $t_3$ and $t_4$. The data symbols are distributed between times $t_0$ and $t_1$, between times $t_2$ and $t_3$, and between times $t_4$ and $t_5$.

In some implementations, a receiving device may estimate the slope of a phase ramp $\hat{\emptyset}$ associated with the received sequence of time-domain symbols based on the pilot symbols received between times $t_1$ and $t_2$, the pilot symbols received between times $t_3$ and $t_4$, or any combination thereof (such as described with reference to FIG. 12). The receiving device may further use the phase estimate $\hat{\emptyset}$ to correct the phases of the data symbols received between times $t_0$ and $t_1$, between times $t_2$ and $t_3$, and between times $t_4$ and $t_5$.

Figure 13C:
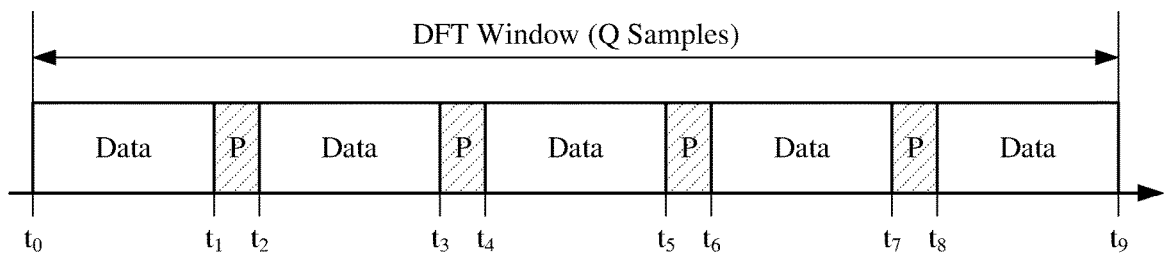
FIG. 13C shows another timing diagram depicting an example sequence of time-domain symbols spanning a Q-point DFT window.

FIG. 13C shows another timing diagram 1320 depicting an example sequence of time-domain symbols spanning a Q-point DFT window. As shown in FIG. 13C, the Q-point DFT window spans a duration from times $t_0$ to $t_9$. The sequence of time-domain symbols includes a number (K) of pilot symbols interspersed between a number (M) of data symbols (where M+K=Q). In some implementations, the M data symbols and the K pilot symbols may be examples of the PPDU 801 and the pilot symbols 802, respectively, of FIG. 8 (or the PPDU 1206 and the pilot symbols 1207, respectively, of FIG. 12). Compared to the pilot symbols of FIG. 13B, the pilot symbols in FIG. 13C are even more evenly distributed within the time-domain sequence, such as between times $t_1$ and $t_2$, between times $t_3$ and $t_4$, between times $t_5$ and $t_6$, and between times $t_7$ and $t_8$. The data symbols are distributed between times $t_0$ and $t_1$, between times $t_2$ and $t_3$, between times $t_4$ and $t_5$, between times $t_6$ and $t_7$, and between times $t_8$ and $t_9$.

In some implementations, a receiving device may estimate the slope of a phase ramp $\emptyset$ associated with the received sequence of time-domain symbols based on the pilot symbols received between times $t_1$ and $t_2$, the pilot symbols received between times $t_3$ and $t_4$, the pilot symbols received between times $t_5$ and $t_6$, the pilot symbols received between times $t_7$ and $t_8$, or any combination thereof (such as described with reference to FIG. 12). The receiving device may further use the phase estimate $\hat{\emptyset}$ to correct the phases of the data symbols received between times $t_0$ and $t_1$, between times $t_2$ and $t_3$, between times $t_4$ and $t_5$, between times $t_6$ and $t_7$, and between times $t_8$ and $t_9$.

Figure 14:
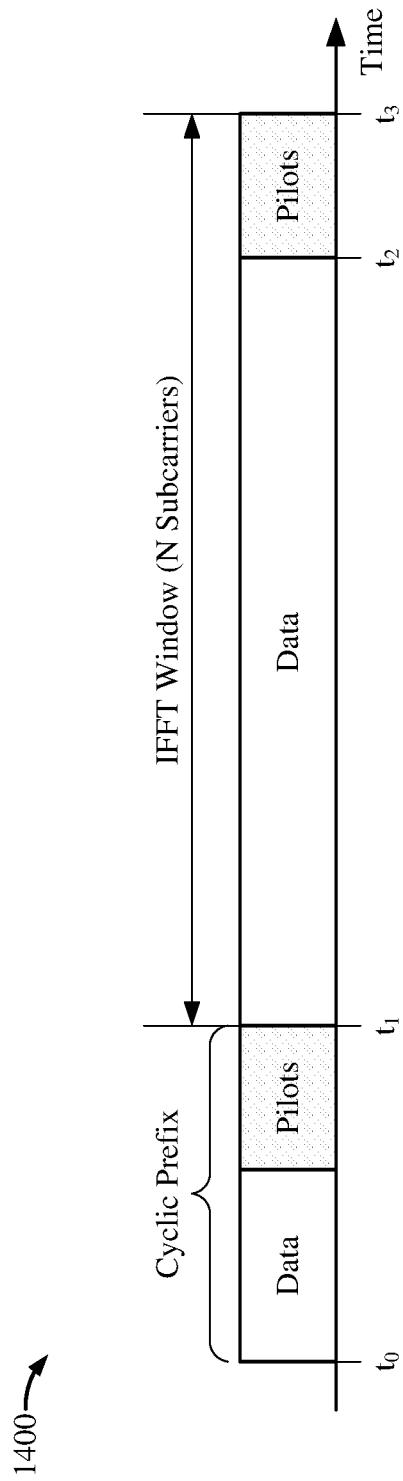
FIG. 14 shows a timing diagram depicting an example sequence of time-domain samples spanning an N-point inverse fast Fourier transform (IFFT) window.

FIG. 14 shows a timing diagram 1400 depicting an example sequence of time-domain samples spanning an N-point IFFT window. As shown in FIG. 14, the N-point IFFT window spans a duration from times $t_1$ to $t_3$. In some implementations, the sequence of time-domain samples spanning an N-point IFFT window (such as between times $t_1$ and $t_3$) may be an example of the TD samples 805 of FIG. 8 (or the non-prefixed samples 1203 of FIG. 12). More specifically, the sequence of time-domain samples includes a number of samples associated with data symbols (also referred to as "data samples") and a number of samples associated with pilot symbols (also referred to as "pilot samples"). In the example of FIG. 14, the pilot samples are concentrated at the end of the time-domain sequence, such as between times $t_2$ and $t_3$, and the data symbols are distributed between times $t_1$ and $t_2$. As a result of cyclic prefixing, the pilot samples (and a portion of the data samples) are copied to the beginning of the time-domain sequence, such as between times $t_0$ and $t_1$.

In some implementations, a receiving device may estimate the slope of a phase ramp $\emptyset$ associated with the received sequence of time-domain symbols based on the pilot symbols received between times to and $t_1$ and the pilot symbols received between times $t_2$ and $t_3$. In other words, rather than discard the cyclic prefix, the receiving device may compare the phase offsets between the pilot samples in the cyclic prefix and the pilot samples at the end of the IFFT window. Because the pilot samples in the cyclic prefix have the same values as the pilot samples at the end of the IFFT window, the receiving device may use either set of pilot samples as a reference. In some implementations, the receiving device may further refine the phase estimate $\hat{\emptyset}$ estimate based on the pilot symbols that are demodulated from the pilot samples received between times $t_2$ and $t_3$ (such as described with reference to FIGS. 12-13C). The receiving device may further use the phase estimate $\hat{\emptyset}$ to correct the phases of the data symbols received between times $t_1$ and $t_2$.

Figure 15:
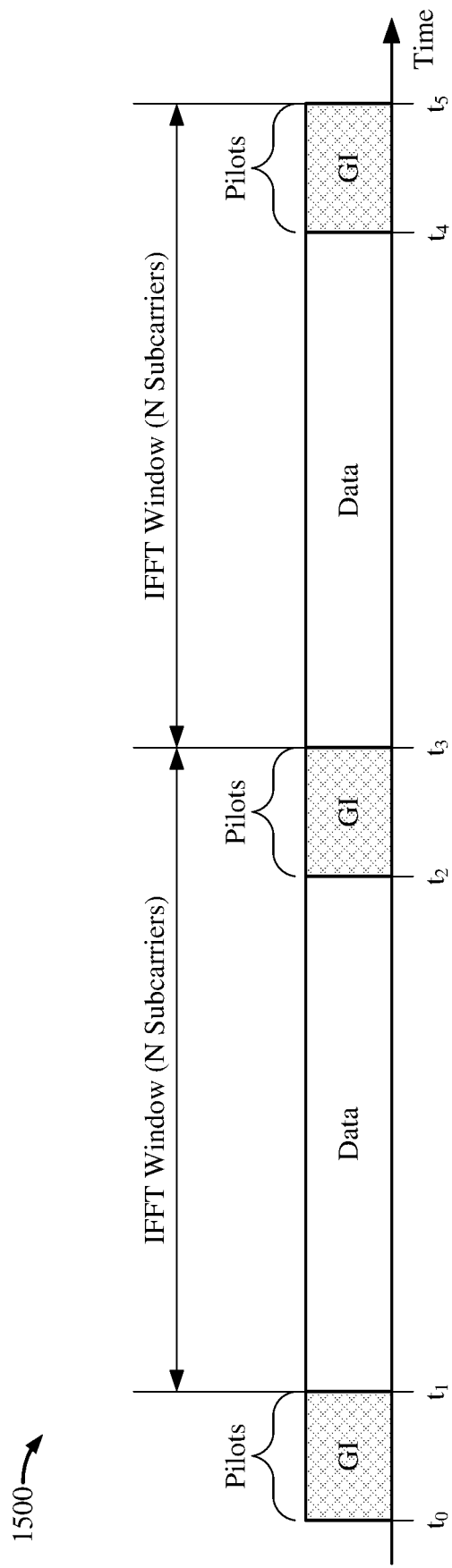
FIG. 15 shows a timing diagram depicting example sequences of time-domain samples each spanning a respective N-point IFFT window.

FIG. 15 shows a timing diagram 1500 depicting example sequences of time-domain samples each spanning a respective N-point IFFT window. As shown in FIG. 15, a first N-point IFFT window spans a duration from times $t_1$ to $t_3$ and a second N-point IFFT window spans a duration from times $t_3$ to $t_5$. In some implementations, each sequence of time-domain samples spanning a respective N-point IFFT window may be an example of the TD samples 805 of FIG. 8 (or the non-prefixed samples 1203 of FIG. 12). More specifically, each sequence of time-domain samples includes a number of data samples and a number of samples associated with a guard interval (also referred to as "GI samples"). As shown in FIG. 15, the GI samples are concentrated at the end of each time-domain sequence, such as between times $t_2$ and $t_3$ and between times $t_4$ and $t_5$, and the data symbols are distributed between times $t_1$ and $t_2$ and between times $t_3$ and $t_4$. In some aspects, the GI samples may provide a buffer to mitigate inter-symbol interference (in lieu of a cyclic prefix) between successive sequences of data samples.

In some implementations, the GI samples may carry a known pattern of values (such as pilot values). More specifically, the same pattern of GI values may be repeated in each guard interval to maintain a circular structure similar to a cyclic prefix. In such implementations, a copy of the GI values may be transmitted before any data samples (such as between times $t_0$ and $t_1$) so that a preliminary guard interval precedes the first OFDM symbol associated with a PPDU. As such, the GI values may be used for channel estimation, carrier frequency offset (CFO) correction, phase noise mitigation, and phase tracking by the receiving device. For example, the phase offset ($\hat{\phi}_k$) associated with the $k^{th}$ sequence of time-domain samples can be expressed as a function of the GI values ($p_{k,i}$) in the $k^{th}$ time-domain sequence, the GI values ($p^*_{0,i}$) in the preliminary guard interval (such as between times $t_0$ and $t_1$), the number of GI samples in each guard interval ($N_{GI}$), and the length of the channel impulse response ($N_{CIR}$):

$$\hat{\Phi}_k = \arg\left(\sum_{i=N_{CIR}}^{N_{GI}-1} p_{k,i} p^*_{0,i}\right)$$

Aspects of the present disclosure further recognize that the length ($L_{corr}$) of the usable correlation window indicates the degree of available noise suppression. For example, the length $L_{corr}$ represents the number of GI samples that are not influenced by inter-symbol interference (ISI) from a previous sequence of time-domain samples:

$L_{corr}=N_{GI}-N_{CIR}+1$

Figure 16:
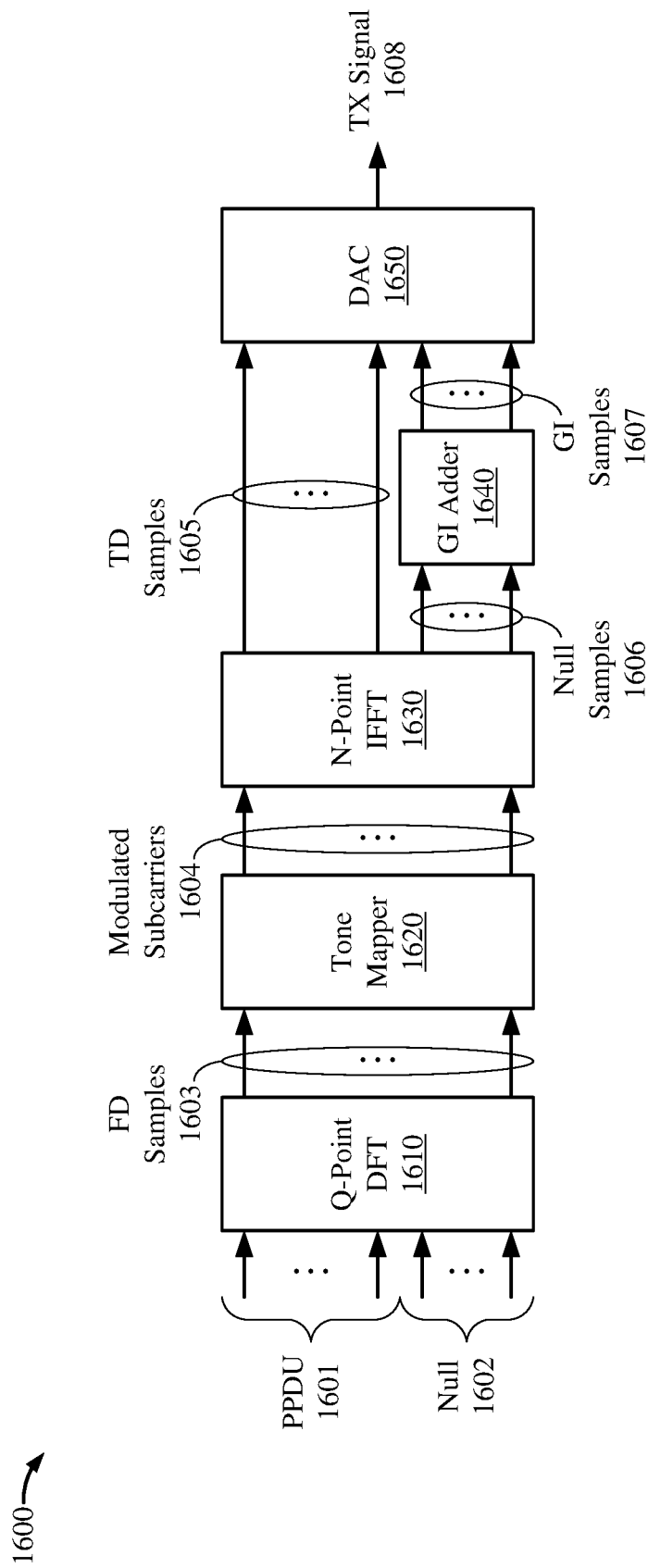
FIG. 16 shows another block diagram of an example SC-FDM modulation system, according to some implementations.

FIG. 16 shows another block diagram of an example SC-FDM modulation system 1600, according to some implementations. In some aspects, the SC-FDM modulation system 1600 may be configured to modulate a PPDU 1601 onto a TX signal 1608. More specifically, the SC-FDM modulation system 1600 may be configured to produce a sequence of data samples followed by a guard interval (such as the sequences of time-domain samples of FIG. 15). In some implementations, the SC-FDM modulation system 1600 may be one example of the SC-FDM modulator 720 of FIG. 7. With reference to FIG. 7, the PPDU 1601 may be one example of the TD symbols 702 and the TX signal 1608 may be one example of the TX signal 703.

The SC-FDM modulation system 1600 includes a Q-point DFT 1610, a tone mapper 1620, an N-point IFFT 1630, a GI adder 1640, and a DAC 1650. The Q-point DFT 1610 converts the PPDU 1601 from the time domain to the frequency domain. In some aspects, the Q-point DFT 1610 may transform a number (M) of data symbols associated with the PPDU 1601 (such as the TD symbols 702 of FIG. 7) into a number (Q) of frequency-domain (FD) samples 1603. For example, Q may represent the size of an RU or M-RU to which the FD samples 1603 are mapped. In some implementations, Q may be an integer value equal to the size of any RU or M-RU defined by existing versions of the IEEE 802.11 standard. In some other implementations, Q may be an integer value that is only divisible by 2, 3, or 5 (such as described with reference to FIG. 8). In some implementations, a number of null symbols 1602 (having values equal to zero) also may be provided as inputs to the Q-point DFT 1610 (where M+K=Q). With reference for example to FIG. 15, the null symbols 1602 may serve as placeholders for one or more GI samples at the end of an IFFT window.

The tone mapper 1620 maps the FD samples 1603 to a number (N) of subcarriers to produce modulated subcarriers 1604. The N subcarriers may represent an OFDM symbol in the frequency domain. In other words, the N subcarriers may span a bandwidth associated with a wireless channel on which the TX signal 1608 is transmitted. In some aspects, N may be greater than Q. Accordingly, the tone mapper 1620 may map the FD samples 1603 to a subset of the N subcarriers representing a Q-subcarrier RU or M-RU spanning a portion of the channel bandwidth. In some aspects, the tone mapper 1620 may map null values onto one or more DC subcarriers (of the N subcarriers) associated with the channel bandwidth (such as described with reference to FIG. 9B). In some implementations, the tone mapper 1620 may map null values onto one or more of the N subcarriers so that the output of the N-point IFFT 1630 includes a series of null samples 1606. With reference for example to FIG. 15, the null samples 1606 may serve as placeholders for one or more GI samples at the end of an IFFT window. For example, at least some of the null samples 1606 may coincide with the null symbols 1602.

The N-point IFFT 1630 transforms the modulated subcarriers 1604, from the frequency domain to the time domain, as a series of time-domain (TD) samples 1605 followed by the series of null samples 1606. With reference for example to FIG. 15, the series of TD samples 1605 may be one example of any of the sequences of data samples within a given IFFT window (such as the data samples distributed between times $t_1$ and $t_2$ or the data samples distributed between times $t_3$ and $t_4$). The GI adder 1640 modulates GI values (or pilot values) onto the null samples 1606 to produce a series of GI samples 1607. With reference for example to FIG. 15, the series of GI samples 1607 may be one example of any of the sequences of GI samples within a given IFFT window (such as the GI samples distributed between times $t_2$ and $t_3$ or the GI samples distributed between times $t_4$ and $t_5$). The DAC 1650 converts the series of TD samples 1605 and the series of GI samples 1607 to the TX signal 1608.

In some aspects, at least a portion of the PHY preamble of the PPDU 1601 may be mapped directly to the N subcarriers in the frequency domain. For example, the PHY preamble may be input directly to the tone mapper 1620 (bypassing the Q-point DFT 1610), which maps the PHY preamble to the same RU or M-RU as the data portion of the PPDU 1601. In some aspects, existing LTF sequences may be mapped to one or more LTFs in the PHY preamble of the PPDU 1601. In some implementations, the LTF(s) may be repeated to compensate for the loss in channel estimation due to distortion of the TX signal 1608 (such as described with reference to FIG. 8). In some other implementations, the LTF symbols may be modified to reduce the PAPR associated with the PPDU 1601 (such as described with reference to FIG. 8). In some other aspects, new SC-LTF sequences may be mapped to one or more LFTs in the PHY preamble of the PPDU 1601. In some implementations, an SC-LTF sequence may be modulated in accordance with higher-order modulation schemes (higher than BPSK) to reduce the PAPR of the PPDU 801 in the time domain. In some other implementations, an SC-LTF sequence may be constructed based on a Zadoff-Chu sequence (such as described with reference to FIG. 8).

Figure 17:
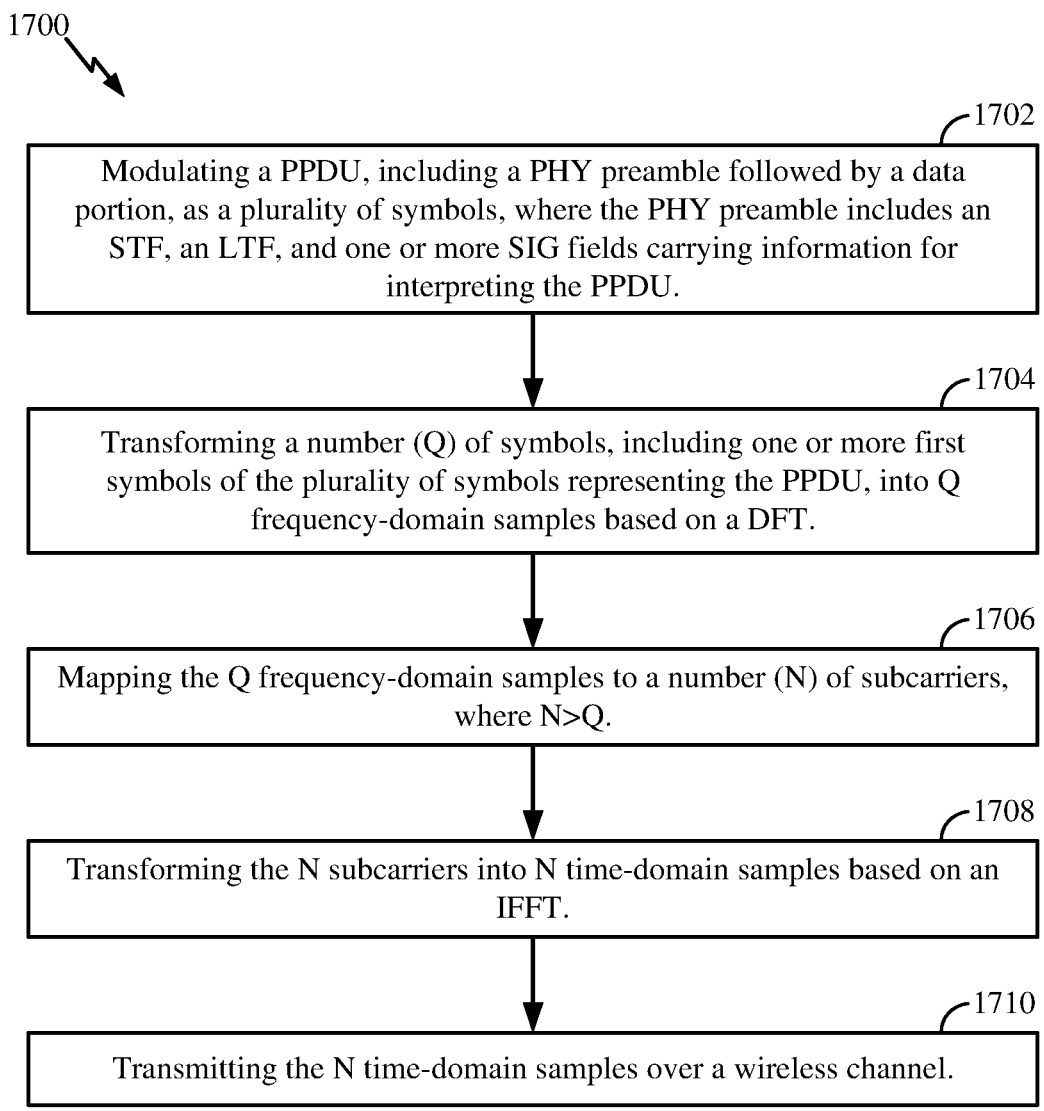
FIG. 17 shows a flowchart illustrating an example process for wireless communication that supports SC-FDM for wireless local area networks (WLANs).

FIG. 17 shows a flowchart illustrating an example process 1700 for wireless communication that supports SC-FDM for WLANs. In some implementations, the process 1700 may be performed by a wireless communication device operating as or within an AP, such as any one of the APs 102 or 502 described above with reference to FIGS. 1 and 5A, respectively. In some other implementations, the process 1700 may be performed by a wireless communication device operating as or within a STA, such as any one of the STAs 104 or 504 described above with reference to FIGS. 1 and 5B, respectively.

In some implementations, the process 1700 begins in block 1702 with modulating a PPDU, including a PHY preamble followed by a data portion, as a plurality of symbols, where the PHY preamble includes a short training field (STF), a long training field (LTF), and one or more signal (SIG) fields carrying information for interpreting the PPDU. In block 1704, the process 1700 proceeds with transforming a number (Q) of symbols, including one or more first symbols of the plurality of symbols representing the PPDU, into Q frequency-domain samples based on a DFT. In block 1706, the process 1700 proceeds with mapping the Q frequency-domain samples to a number (N) of subcarriers, where N>Q. In block 1708, the process 1700 proceeds with transforming the N subcarriers into N time-domain samples based on an IFFT. In block 1710, the process 1700 proceeds with transmitting the N time-domain samples over a wireless channel.

In some aspects, the process 1700 may further include mapping one or more null values to one or more subcarriers, respectively, of the N subcarriers, where each of the one or more subcarriers represents a DC subcarrier associated with a bandwidth of the wireless channel. In some aspects, the N subcarriers may be subdivided into a number (n) of sections each associated with a respective index (i), where $1 \le i \le n$. In such aspects, the process 1700 may further include applying a series of first phase rotations to the subcarriers in each section, of the n sections, associated with an even index i; and applying a series of second phase rotations to the subcarriers in each section, of the n sections, associated with an odd index i, where the series of second phase rotations is different than the series of first phase rotations.

In some aspects, Q may only be divisible by 2, 3, or 5. In some aspects, the Q symbols may further include one or more pilot symbols associated with a phase tracking operation. In some implementations, the one or more pilot symbols may be interspersed between the one or more first symbols. In some other implementations, the one or more pilot symbols may be positioned contiguously, in the time domain, following the one or more first symbols. In some implementations, the process 1700 may further include prepending, to the N time-domain samples, a cyclic prefix that includes the one or more pilot symbols.

In some other aspects, the Q symbols may further include one or more null symbols positioned contiguously, in the time domain, following the one or more first symbols, where each of the one or more null symbols has a value equal to zero that maps to a respective null sample of the N time-domain samples. In such aspects, the process 1700 may further include transmitting a sequence of GI values immediately preceding the N time-domain samples; and modulating the sequence of GI values on the one or more null samples of the N time-domain samples.

In some aspects, the process 1700 may further include mapping one or more second symbols of the plurality of symbols directly to the N subcarriers, where the one or more second symbols represent at least a portion of the PHY preamble. In some implementations, the portion of the PHY preamble may include the LTF. In some implementations, the LTF may be modulated according to a modulation scheme having a higher modulation order than BPSK. In some other implementations, the LTF may include a sequence of values (x) associated with a Zadoff-Chu sequence having a sequence index (m), a root index (u), and a sequence length (N), where:

$$x(m) = e^{-j\frac{\pi um(m+1)}{N}}$$

In some implementations, N may be a prime number associated with a resource unit (RU) or multiple-RU (M-RU) to which the Q frequency-domain samples are mapped. In some other implementations, N may be a prime number associated with a bandwidth of the wireless channel.

Figure 18:
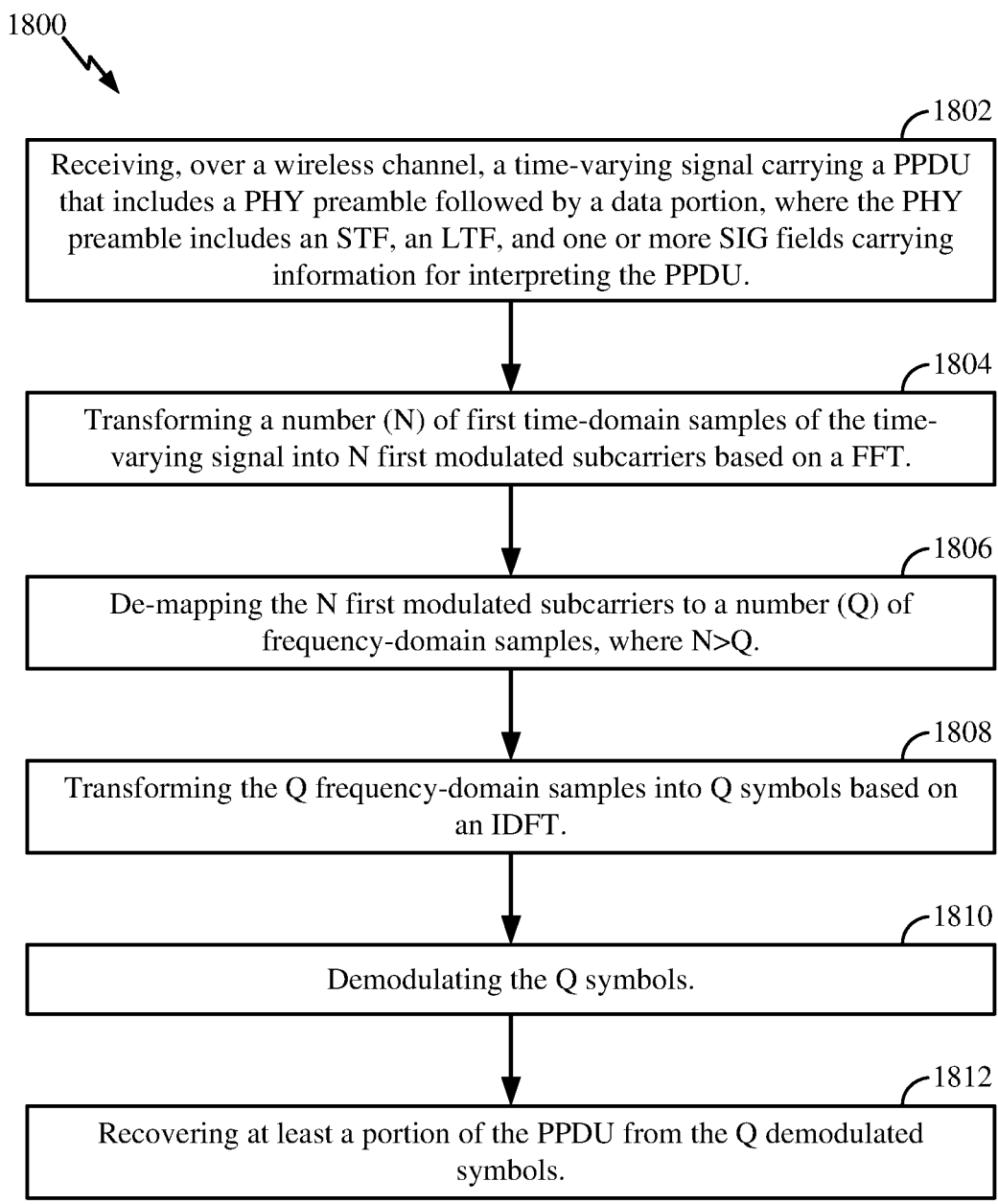
FIG. 18 shows a flowchart illustrating an example process for wireless communication that supports SC-FDM for WLANs.

FIG. 18 shows a flowchart illustrating an example process for wireless communication that supports SC-FDM for WLAN. In some implementations, the process 1800 may be performed by a wireless communication device operating as or within an AP, such as any one of the APs 102 or 502 described above with reference to FIGS. 1 and 5A, respectively. In some other implementations, the process 1800 may be performed by a wireless communication device operating as or within a STA, such as any one of the STAs 104 or 504 described above with reference to FIGS. 1 and 5B, respectively.

In some implementations, the process 1800 begins in block 1802 with receiving, over a wireless channel, a time-varying signal carrying a PPDU that includes a PHY preamble followed by a data portion, the PHY preamble including a short training field (STF), a long training field (LTF), and one or more signal (SIG) fields carrying information for interpreting the PPDU. In block 1804, the process 1800 proceeds with transforming a number (N) of first time-domain samples of the time-varying signal into N first modulated subcarriers based on an FFT. In block 1806, the process 1800 proceeds with de-mapping the N first modulated subcarriers to a number (Q) of frequency-domain samples, where N>Q. In block 1808, the process 1800 proceeds with transforming the Q frequency-domain samples into Q symbols based on an IDFT. In block 1810, the process 1800 proceeds with demodulating the Q symbols. In block 1812, the process 1800 proceeds with recovering at least a portion of the PPDU from the Q demodulated symbols.

In some aspects, Q may only be divisible by 2, 3, or 5. In some aspects, the Q symbols may include one or more pilot symbols associated with a phase tracking operation. In some implementations, the one or more pilot symbols may be interspersed between one or more data symbols of the Q symbols representing the portion of the PPDU. In some other implementations, the one or more pilot symbols may be positioned contiguously, in the time domain, following one or more data symbols of the Q symbols representing the portion of the PPDU. In some implementations, the received time-varying signal may include a cyclic prefix preceding the N time-domain samples, where the cyclic prefix includes the one or more pilot symbols.

In some other aspects, the received time-varying signal includes a sequence of GI values immediately preceding the N time-domain samples. In such aspects, the process 1800 may further include recovering the sequence of GI values from one or more first symbols of the Q symbols positioned contiguously, in the time domain, following one or more data symbols of the Q symbols representing the portion of the PPDU.

In some aspects, the process 1800 may further include transforming N second time-domain samples of the received time-varying signal into N second modulated subcarriers based on the FFT; demodulating the N second modulated subcarriers; and recovering at least a portion of the PHY preamble from the N demodulated subcarriers. In some aspects, the portion of the PHY preamble recovered from the N demodulated subcarriers may include the LTF. In some implementations, the N second modulated subcarriers may be demodulated according to a modulation scheme having a higher modulation order than BPSK. In some other implementations, the LTF may include a sequence of values (x) associated with a Zadoff-Chu sequence having a sequence index (m), a root index (u), and a sequence length (N), where:

$$x(m) = e^{-j\frac{\pi um(m+1)}{N}}$$

In some implementations, N may be a prime number associated with an RU or M-RU to which the Q frequency-domain samples are mapped. In some other implementations, N may be a prime number associated with a bandwidth of the wireless channel.

Figure 19:
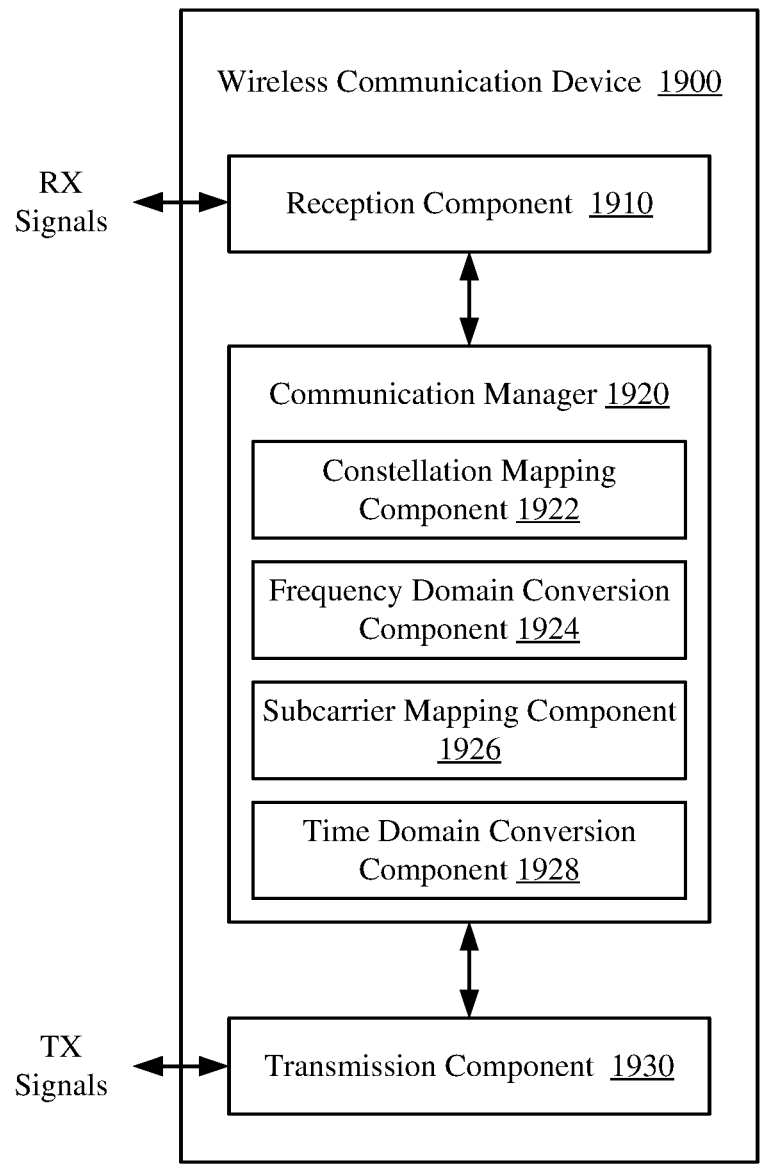
FIG. 19 shows a block diagram of an example wireless communication device according to some implementations.

FIG. 19 shows a block diagram of an example wireless communication device 1900 according to some implementations. In some implementations, the wireless communication device 1900 is configured to perform the process 1700 described with reference to FIG. 17. The wireless communication device 1900 can be an example implementation of the wireless communication device 400 described above with reference to FIG. 4. For example, the wireless communication device 1900 can be a chip, SoC, chipset, package or device that includes at least one processor and at least one modem (for example, a Wi-Fi (IEEE 802.11) modem or a cellular modem).

The wireless communication device 1900 includes a reception component 1910, a communication manager 1920, and a transmission component 1930. The communication manager 1920 further includes a constellation mapping component 1922 and a frequency domain conversion component 1924, a subcarrier mapping component 1926, and a time domain conversion component 1928. Portions of one or more of the components 1922, 1924, 1926, and 1928 may be implemented at least in part in hardware or firmware. In some implementations, at least some of the components 1922, 1924, 1926, or 1928 are implemented at least in part as software stored in a memory (such as the memory 408). For example, portions of one or more of the components 1922, 1924, 1926, and 1928 can be implemented as non-transitory instructions (or "code") executable by a processor (such as the processor 406) to perform the functions or operations of the respective component.

The reception component 1910 is configured to receive RX signals, over a wireless channel, from one or more other wireless communication devices. The communication manager 1920 is configured to control or manage communications with one or more other wireless communication devices. In some implementations, the constellation mapping component 1922 may modulate a PPDU, including a PHY preamble followed by a data portion, as a plurality of symbols, where the PHY preamble includes a short training field (STF), a long training field (LTF), and one or more signal (SIG) fields carrying information for interpreting the PPDU; the frequency domain conversion component 1924 may transform a number (Q) of symbols, including one or more first symbols of the plurality of symbols representing the PPDU, into Q frequency-domain samples based on a DFT; the subcarrier mapping component 1926 may map the Q frequency-domain samples to a number (N) of subcarriers, where N>Q; and the time domain conversion component 1928 may transform the N subcarriers into N time-domain samples based on an IFFT. The transmission component 1930 is configured to transmit TX signals, over a wireless channel, to one or more other wireless communication devices. In some implementations, the transmission component 1930 may transmit the N time-domain samples over a wireless channel.

Figure 20:
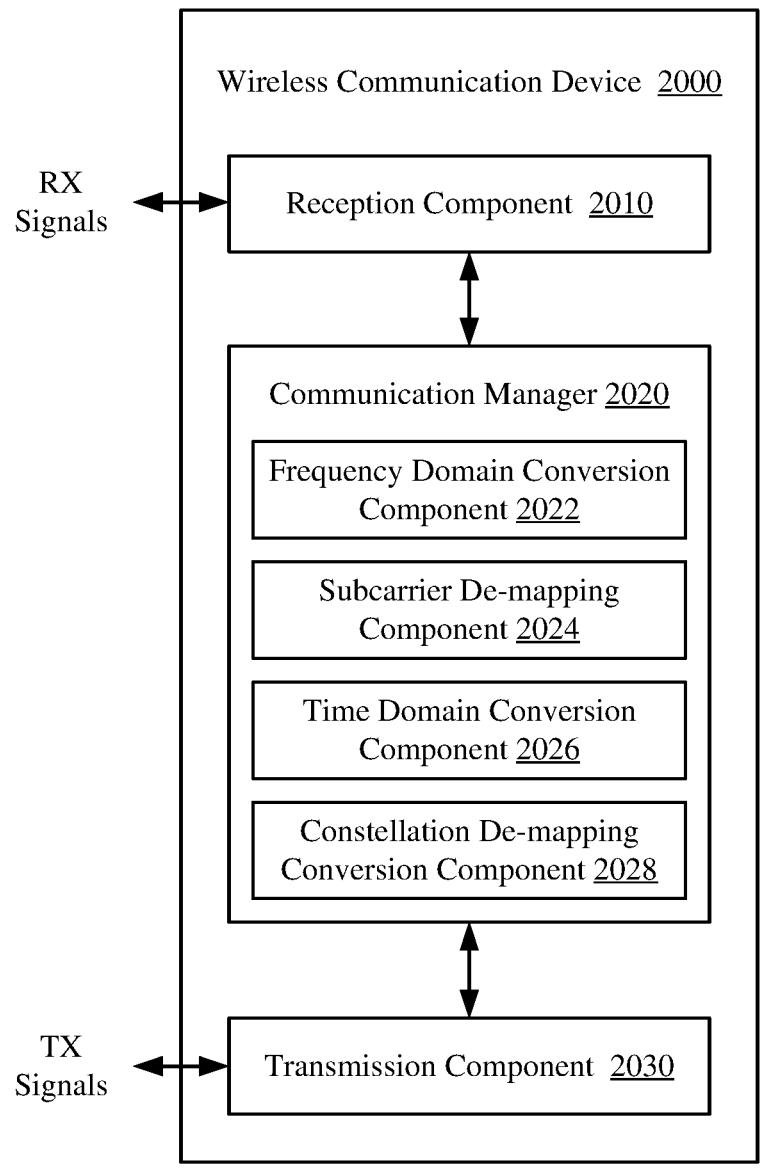
FIG. 20 shows a block diagram of an example wireless communication device according to some implementations.

FIG. 20 shows a block diagram of an example wireless communication device 2000 according to some implementations. In some implementations, the wireless communication device 2000 is configured to perform the process 1800 described with reference to FIG. 18. The wireless communication device 2000 can be an example implementation of the wireless communication device 400 described above with reference to FIG. 4. For example, the wireless communication device 2000 can be a chip, SoC, chipset, package or device that includes at least one processor and at least one modem (for example, a Wi-Fi (IEEE 802.11) modem or a cellular modem).

The wireless communication device 2000 includes a reception component 2010, a communication manager 2020, and a transmission component 2030. The communication manager 2020 further includes a frequency domain conversion component 2022, a subcarrier de-mapping component 2024, a time domain conversion component 2026, and a constellation de-mapping component 2028. Portions of one or more of the components 2022, 2024, 2026 and 2028 may be implemented at least in part in hardware or firmware. In some implementations, at least some of the components 2022, 2024, 2026 or 2028 are implemented at least in part as software stored in a memory (such as the memory 408). For example, portions of one or more of the components 2022, 2024, 2026, and 2028 can be implemented as non-transitory instructions (or "code") executable by a processor (such as the processor 406) to perform the functions or operations of the respective component.

The reception component 2010 is configured to receive RX signals, over a wireless channel, from one or more other wireless communication devices. In some implementations, the reception component 2010 may receive, over a wireless channel, a time-varying signal carrying a PPDU that includes a PHY preamble followed by a data portion, where the PHY preamble includes a short training field (STF), a long training field (LTF), and one or more signal (SIG) fields carrying information for interpreting the PPDU. The communication manager 2020 is configured to control or manage communications with one or more other wireless communication devices. In some implementations, the frequency domain conversion component 2022 may transform a number (N) of first time-domain samples of the time-varying signal into N first modulated subcarriers based on an FFT; the subcarrier de-mapping component 2024 may de-map the N first modulated subcarriers to a number (Q) of frequency-domain samples, where N>Q; the time domain conversion component 2026 may transform the Q frequency-domain samples into Q symbols based on an IDFT; and the constellation de-mapping component 2028 may demodulate the Q symbols and recover at least a portion of the PPDU from the Q demodulated symbols. The transmission component 2030 is configured to transmit TX signals, over a wireless channel, to one or more other wireless communication devices.

Implementation examples are described in the following numbered clauses:

1. A method for wireless communication by a wireless communication device, including:

modulating a physical layer (PHY) convergence protocol (PLCP) protocol data unit (PPDU), including a PHY preamble followed by a data portion, as a plurality of symbols, the PHY preamble including a short training field (STF), a long training field (LTF), and one or more signal (SIG) fields carrying information for interpreting the PPDU;

transforming a number (Q) of symbols, including one or more first symbols of the plurality of symbols representing the PPDU, into Q frequency-domain samples based on a discrete Fourier transform (DFT);

mapping the Q frequency-domain samples to a number (N) of subcarriers, where N>Q;

transforming the N subcarriers into N time-domain samples based on an inverse fast Fourier transform (IFFT); and transmitting the N time-domain samples over a wireless channel.

2. The method of clause 1, further including:

mapping one or more null values to one or more subcarriers, respectively, of the N subcarriers, each of the one or more subcarriers representing a direct current (DC) subcarrier associated with a bandwidth of the wireless channel.

3. The method of any of clauses 1 or 2, where the N subcarriers are subdivided into a number (n) of sections each associated with a respective index (i), where 1≤i≤n, the method further including:

applying a series of first phase rotations to the subcarriers in each section, of the n sections, associated with an even index i; and applying a series of second phase rotations to the subcarriers in each section, of the n sections, associated with an odd index i, the series of second phase rotations being different than the series of first phase rotations.

4. The method of any of clauses 1-3, where the Q symbols further include one or more pilot symbols associated with a phase tracking operation.

5. The method of any of clauses 1-4, where the one or more pilot symbols are interspersed between the one or more first symbols.

6. The method of any of clauses 1-4, where the one or more pilot symbols are positioned contiguously, in the time domain, following the one or more first symbols.

7. The method of any of clauses 1-4 or 6, further including:

prepending, to the N time-domain samples, a cyclic prefix that includes the one or more pilot symbols.

8. The method of any of clauses 1-3, where the Q symbols further include one or more null symbols positioned contiguously, in the time domain, following the one or more first symbols, each of the one or more null symbols having a value equal to zero that maps to a respective null sample of the N time-domain samples, the method further including:
transmitting a sequence of guard interval (GI) values immediately preceding the N time-domain samples; and
modulating the sequence of GI values on the one or more null samples of the N time-domain samples.

9. The method of any of clauses 1-8, further including:
mapping one or more second symbols of the plurality of symbols directly to the N subcarriers, the one or more second symbols representing at least a portion of the PHY preamble.

10. The method of any of clauses 1-9, where the portion of the PHY preamble includes the LTF.

11. The method of any of clauses 1-10, where the LTF is modulated according to a modulation scheme having a higher modulation order than binary phase-shift keying (BPSK).

12. The method of any of clauses 1-10, where the LTF includes a sequence of values (x) associated with a Zadoff-Chu sequence having a sequence index (m), a root index (u), and a sequence length (N), where:

$$x(m) = e^{-j\frac{\pi um(m+1)}{N}}$$

13. The method of any of clauses 1-10 or 12, where N is a prime number associated with a resource unit (RU) or multiple-RU (M-RU) to which the Q frequency-domain samples are mapped.

14. The method of any of clauses 1-10 or 12, where N is a prime number associated with a bandwidth of the wireless channel.

15. The method of any of clauses 1-14, where Q is only divisible by 2, 3, or 5.

16. A wireless communication device including:
at least one memory; and
at least one processor communicatively coupled with the at least one memory, the at least one processor configured to cause the wireless communication device to perform the method of any one or more of clauses 1-15.

17. A method for wireless communication by a wireless communication device, including:
receiving, over a wireless channel, a time-varying signal carrying a physical layer (PHY) convergence protocol (PLCP) protocol data unit (PPDU) that includes a PHY preamble followed by a data portion, the PHY preamble including a short training field (STF), a long training field (LTF), and one or more signal (SIG) fields carrying information for interpreting the PPDU;
transforming a number (N) of first time-domain samples of the time-varying signal into N first modulated subcarriers based on a fast Fourier transform (FFT);
de-mapping the N first modulated subcarriers to a number (Q) of frequency-domain samples, where N>Q;
transforming the Q frequency-domain samples into Q symbols based on an inverse discrete Fourier transform (IDFT);
demodulating the Q symbols; and
recovering at least a portion of the PPDU from the Q demodulated symbols.

18. The method of clause 17, where the Q symbols include one or more pilot symbols associated with a phase tracking operation.

19. The method of any of clauses 17 or 18, where the one or more pilot symbols are interspersed between one or more data symbols of the Q symbols representing the portion of the PPDU.

20. The method of any of clauses 17 or 18, where the one or more pilot symbols are positioned contiguously, in the time domain, following one or more data symbols of the Q symbols representing the portion of the PPDU.

21. The method of any of clauses 17, 18, or 20, where the received time-varying signal includes a cyclic prefix preceding the N time-domain samples, the cyclic prefix including the one or more pilot symbols.

22. The method of clause 17, where the received time-varying signal includes a sequence of guard interval (GI) values immediately preceding the N time-domain samples, the method further including:
recovering the sequence of GI values from one or more first symbols of the Q symbols positioned contiguously, in the time domain, following one or more data symbols of the Q symbols representing the portion of the PPDU.

23. The method of any of clauses 17-22, further including:
transforming N second time-domain samples of the received time-varying signal into N second modulated subcarriers based on the FFT;
demodulating the N second modulated subcarriers; and
recovering at least a portion of the PHY preamble from the N demodulated subcarriers.

24. The method of any of clauses 17-23, where the portion of the PHY preamble recovered from the N demodulated subcarriers includes the LTF.

25. The method of any of clauses 17-24, where the N second modulated subcarriers are demodulated according to a modulation scheme having a higher modulation order than binary phase-shift keying (BPSK).

26. The method of any of clauses 17-24, where the LTF includes a sequence of values (x) associated with a Zadoff-Chu sequence having a sequence index (m), a root index (u), and a sequence length (N), where:

$$x(m) = e^{-j\frac{\pi um(m+1)}{N}}$$

27. The method of any of clauses 17-24 or 26, where N is a prime number associated with a resource unit (RU) or multiple-RU (M-RU) to which the Q frequency-domain samples are mapped.

28. The method of any of clauses 17-24 or 26, where N is a prime number associated with a bandwidth of the wireless channel.

29. The method of any of clauses 17-28, where Q is only divisible by 2, 3, or 5.

30. A wireless communication device including:
at least one memory; and
at least one processor communicatively coupled with the at least one memory, the at least one processor configured to cause the wireless communication device to perform the method of any one or more of clauses 17-29.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c. As used herein, "based on" is intended to be interpreted in the inclusive sense, unless otherwise explicitly indicated. For example, "based on" may be used interchangeably with "based at least in part on," unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions, or information.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication performed by a wireless communication device, comprising:
    mapping a data portion associated with a physical layer protocol data unit (PPDU) to a set of M time-domain symbols;
    transforming a set of Q time-domain symbols, that includes the set of M time-domain symbols, into a set of Q frequency-domain samples in accordance with a Q-point discrete Fourier transform (DFT), the set of Q time-domain symbols further including one or more pilot symbols;
    modulating a set of N orthogonal subcarriers with the set of Q frequency-domain samples, where N>Q;
    transforming the N modulated subcarriers into a set of N time-domain samples in accordance with an N-point inverse fast Fourier transform (IFFT);
    prepending, to the set of N time-domain samples, a cyclic prefix that includes the one or more pilot symbols; and
    transmitting the set of N time-domain samples over a wireless channel.

2. The method of claim 1, further comprising:
    mapping one or more null values to one or more subcarriers, respectively, of the set of N orthogonal subcarriers, each of the one or more subcarriers representing a direct current (DC) subcarrier associated with a bandwidth of the wireless channel.

3. The method of claim 1, wherein the set of N orthogonal subcarriers are subdivided into a number (n) of sections each associated with a respective index (i), where 1≤i≤n, the method further comprising:
    applying a series of first phase rotations to the set of N orthogonal subcarriers in each section, of the n sections, associated with an even index i; and
    applying a series of second phase rotations to the set of N orthogonal subcarriers in each section, of the n sections, associated with an odd index i, the series of the second phase rotations being different than the series of the first phase rotations.

4. The method of claim 1, wherein the one or more pilot symbols are interspersed between the set of M time-domain symbols.

5. The method of claim 1, wherein the one or more pilot symbols are positioned contiguously, in the time domain, following the set of M time-domain symbols.

6. The method of claim 1, wherein the set of Q time-domain symbols further includes one or more null symbols positioned contiguously, in the time domain, following the set of M time-domain symbols, each of the one or more null symbols having a value equal to zero that maps to a respective null symbol of the set of N time-domain samples, the method further comprising:
    transmitting a sequence of guard interval (GI) values immediately preceding the set of N time-domain samples; and
    modulating the sequence of GI values on the one or more null symbols of the set of N time-domain samples.

7. The method of claim 1, further comprising:
    mapping a sequence of symbols for a long training field (LFT) of a preamble of the PPDU directly to the set of N orthogonal subcarriers.

8. The method of claim 7, wherein the LTF is modulated according to a modulation scheme having a higher modulation order than binary phase-shift keying (BPSK).

9. The method of claim 7, wherein the LTF comprises a sequence of values (x) associated with a Zadoff-Chu sequence having a sequence index (m), a root index (u), and a sequence length (N), where:

$$x(m) = e^{-j\frac{\pi um(m+1)}{N}}.$$

10. The method of claim 9, wherein N is a prime number associated with a resource unit (RU) or multiple-RU (M-RU) to which the set of Q frequency-domain samples are mapped.

11. The method of claim 9, wherein N is a prime number associated with a bandwidth of the wireless channel.

12. The method of claim 1, wherein Q is only divisible by 2, 3, or 5.

13. A wireless communication device comprising:
   at least one memory; and
   at least one processor communicatively coupled with the at least one memory, the at least one processor configured to cause the wireless communication device to:
      map a data portion associated with a physical layer protocol data unit (PPDU) to a set of M time-domain symbols;
      transform a set of Q time-domain symbols, that includes the set of M time-domain symbols, into a set of Q frequency-domain samples in accordance with a Q-point discrete Fourier transform (DFT) the set of Q time-domain symbols further including one or more null symbols, wherein the one or more null symbols are positioned contiguously, in the time-domain, following the set of M time-domain symbols;
      modulate a set of N orthogonal subcarriers with the set of Q frequency-domain samples, where N>Q;
      transform the N modulated subcarriers into a set of N time-domain samples in accordance with an N-point inverse fast Fourier transform (IFFT);
      transmit a sequence of guard interval (GI) values immediately preceding the set of N time-domain samples;
      modulate the sequence of GI values on one or more null samples of the set of N time-domain samples, each of the one or more null samples being mapped to a respective null sample of the one or more null samples; and
   transmit the set of N time-domain samples over a wireless channel.

14. A method of wireless communication performed by a wireless communication device comprising:
   receiving a time-varying signal that includes a set of N time-domain samples over a wireless channel, the time-varying signal including a cyclic prefix preceding the set of N time-domain samples, wherein the cyclic prefix includes one or more pilot symbols;
   transforming the set of N time-domain samples into a set of N modulated subcarriers in accordance with an N-point fast Fourier transform (FFT);
   demodulating the set of N modulated subcarriers to obtain a set of Q frequency-domain samples, where N>Q;
   transforming the set of Q frequency-domain samples into a set of Q time-domain symbols in accordance with a Q-point an inverse discrete Fourier transform (IDFT), the set of Q time-domain symbols including a set of M time-domain data symbols associated with a data portion of a physical layer protocol data unit (PPDU), the set of Q time-domain symbols further including the one or more pilot symbols; and
   recovering at least a portion of a data portion of the PPDU in accordance with the set of Q time-domain symbols.

15. The method of claim 14, wherein the one or more pilot symbols are interspersed between one or more data symbols of the set of M time-domain data symbols.

16. The method of claim 14, wherein the one or more pilot symbols are positioned contiguously, in the time domain, following one or more data symbols of the set of M time-domain data symbols.

17. The method of claim 14, wherein the received time-varying signal includes a sequence of guard interval (GI) values immediately preceding the set of N time-domain samples, the method further comprising:
   recovering the sequence of GI values from one or more null symbols that are positioned contiguously, in the time domain, following one or more data symbols of the set of M time-domain data symbols.

18. The method of claim 14, further comprising demodulating a sequence of symbols of a long training field (LFT) of a preamble of the PPDU from the time-varying signal without performing the N-point FFT on the sequence of symbols.

19. The method of claim 18, wherein the sequence of symbols of the LTF are demodulated according to a modulation scheme having a higher modulation order than binary phase-shift keying (BPSK).

20. The method of claim 18, wherein the LTF comprises a sequence of values (x) associated with a Zadoff-Chu sequence having a sequence index (m), a root index (u), and a sequence length (N), where:

$$x(m) = e^{-j\frac{\pi um(m+1)}{N}}.$$

21. The method of claim 20, wherein N is a prime number associated with a resource unit (RU) or multiple-RU (M-RU) to which the set of Q frequency-domain samples are mapped.

22. The method of claim 20, wherein N is a prime number associated with a bandwidth of the wireless channel.

23. The method of claim 14, wherein Q is only divisible by 2, 3, or 5.

24. A wireless communication device comprising:
   at least one memory; and
   at least one processor communicatively coupled with the at least one memory, the at least one processor configured to cause the wireless communication device to:
      receive, a time-varying signal that includes a set of N time-domain samples over a wireless channel, wherein the time-varying signal includes a sequence of guard interval (GI) values immediately preceding the N time-domain samples;
      transform the set of N time-domain samples into a set of N modulated subcarriers in accordance with an N-point fast Fourier transform (FFT);
      demodulate the set of N modulated subcarriers to obtain a set of Q frequency-domain samples, where N>Q;
      transform the set of Q frequency-domain samples into a set of Q time-domain symbols in accordance with a Q-point an inverse discrete Fourier transform (IDFT), the set of Q time-domain symbols including a set of M time-domain data symbols associated with a data portion of a physical layer protocol data unit (PPDU), the set of Q time-domain symbols further including one or more null symbols;

recover at least a portion of a data portion of the PPDU in accordance with the set of Q time-domain symbols; and recover the sequence of GI values from the one or more null symbols positioned contiguously, in the time-domain, following one or more data symbols of the set of M time-domain data symbols.

* * * * *